United States Patent
Umehara et al.

[19]
[11] Patent Number: 5,855,979
[45] Date of Patent: *Jan. 5, 1999

[54] OPTICAL RECORDING MEDIUM

[75] Inventors: Hideki Umehara, Yokohama; Jun Tokuhiro, Mobara; Yuji Inatomi, Kamakura; Tomoyoshi Sasakawa, Chiba; Tsutami Misawa; Kenichi Sugimoto, both of Yokohama; Taizo Nishimoto, Kamakura; Takeshi Tsuda, Yokohama, all of Japan

[73] Assignee: Mitsui Chemicals, Inc., Tokyo, Japan

[*] Notice: The term of this patent shall not extend beyond the expiration date of Pat. No. 5,633,106.

[21] Appl. No.: 904,549

[22] Filed: Aug. 4, 1997

[30] Foreign Application Priority Data

Aug. 8, 1996  [JP]  Japan ..................... 8-209755
Aug. 22, 1996  [JP]  Japan ..................... 8-221449

[51] Int. Cl.$^6$ ..................... B32B 3/00
[52] U.S. Cl. ............... 428/64.1; 428/64.2; 428/64.4; 428/64.8; 428/457; 428/913; 430/270.14; 430/270.17; 430/495.1; 430/945; 369/288
[58] Field of Search .................. 428/64.1, 64.2, 428/64.4, 64.8, 457, 913; 430/270.14, 270.17, 495.1, 945; 369/283, 288

[56] References Cited

U.S. PATENT DOCUMENTS 5,124,067  6/1992  Itoh et al. .
5,492,744  2/1996  Koikle et al. ................. 428/64.1
5,633,106  5/1997  Aihara et al. ................. 430/21
5,672,462  9/1997  Takuma et al. .............. 430/270.15

FOREIGN PATENT DOCUMENTS 3-290835  12/1991  Japan .
5-67438  9/1993  Japan .
7-98887  4/1995  Japan .
8-108623  4/1996  Japan .
8-99467  4/1996  Japan .
WO 91/18950  12/1991  WIPO .

OTHER PUBLICATIONS

Masamichi Furukawa, *Analytica Chimica Acta*, 140 (1982) pp. 281–289.

*Optical Data Storage 1989 Technical Digest Series*, vol. 1, pp. 45–48, 1989.

Primary Examiner—Elizabeth Evans
Attorney, Agent, or Firm—Burns, Doane, Swecker & Mathis, L.L.P.

[57] ABSTRACT

An optical recording medium comprising a recording layer, a light interference layer, a reflective layer and a protective layer that are laminated on a substrate, characterized in that said recording layer and said light interference layer comprise at least one organic dye, and that a light absorbent and/or a thermal decomposition promoter are/is added to said light interference layer, wherein the optical recording medium has compatibility that allows good recording and/or reproduction by using lasers of different two wavelength ranges and has good recording properties.

38 Claims, 2 Drawing Sheets

OPTICAL RECORDING MEDIUM

BACKGROUND OF THE INVENTION (1). Field of the Invention

The present invention relates to an optical recording medium and, more particularly, to an optical recording medium that allows recording and/or reproducing information at wavelengths of plural laser beams.

(2). Description of the Related Art

Compact disc-recordables (CD-Rs) are disclosed in, for example, Optical Data Storage 1989, Technical Digest Series Vol. 1, p. 45 (1989) as a write-once type optical recording medium satisfying compact disc (hereinafter, referred to as CD) standards and is on the market. A CD-R is laminated, as shown in FIG. 1, with a recording layer 2, a reflective layer 3 and a protective layer 4 in this order on a transparent resin substrate 1. The recording layer changes physically or chemically when irradiated with a high power laser beam, and thus the information is recorded in the form of pits. The information in the pits can be reproduced by means of irradiating a low power laser beam to the pits formed in the recording layer and detecting a change of a reflectance. A near infrared semiconductor laser having a wavelength of 770 to 830 nm is typically used for recording and reproducing such optical recording media which satisfies CD standards such as the Red Book Standards and the Orange Book standards. Therefore, it is compatible with CD players and CD-ROM players.

Such conventional optical recording media has, however, a recording capacity of only about 650 MB, which is not enough when taking account of recording of dynamic digital images. Thus, there is an increasing demand for an information recording medium having a higher density and a higher capacity.

Recently, a red semiconductor laser having a selected wavelength of from 620 to 690 nm has been developed. Under such circumstances, it is becoming increasingly possible to record and/or reproduce information at a higher density. With this semiconductor laser, such high-density recording media have been developed that have a recording capacity of 5–8 times as large as that of the conventional media. In addition, players for such high density recording media have also been developed. For example, digital video discs (DVD) have been on the market that have dynamic images of 2 hours or longer recorded thereon in a digital format.

In addition, lasers having a wavelength of around 530 nm and 420 nm have been put into practice that uses a higher harmonic wave conversion of a YAG laser. Furthermore, semiconductor lasers having a wavelength of around 490 nm and 410 nm have also been developed.

However, software and continuity of the recorded data are lost when the optical recording medium has no compatibility for various wavelengths even if the high-density optical recording media and players that use such a short-wave laser are introduced. The CD-R media now available on the market have a small reflectance of 10% or lower when it is attempted to reproduce information thereon by using a light beam having a wavelength selected from the range between 400 and 440 nm, between 480 and 540 nm, and between 620 and 690 nm. In addition, a degree of modulation is also very small. The recording is low-to-high recording in which the reflectance of the recorded portion is higher than that of the non-recorded portion. This is not preferable because the polarity is reversed from common CDs (high-to-low recording). Furthermore, a large deformation is observed in recorded waveforms, so that it is difficult to play such a recording medium by using a player for high-density recording which is provided with a laser having a wavelength selected from the range between 400 and 440 nm, between 480 and 540 nm, and between 620 and 690 nm.

Japanese Patent Laid-Open No. 3-290835 discloses a medium having an interference layer comprising a low molecular weight organic compound between a recording layer and a reflective layer comprising an aluminum alloy. This medium uses the aluminum alloy instead of expensive gold for the reflective layer, and has an interference layer to achieve the reflectance of 70% or higher at 780 nm. In this medium, the reflectance is certainly 70% or higher at 780 nm. However, the reflectance is low to the light beam having a wavelength selected from the range between 400 and 690 nm, so that it is difficult to reproduce the recorded information by using a player for a high-density medium.

Japanese Patent Laid-Open Nos. 8-99467 and 8-108623 propose an optical recording medium in which a dye-containing recording layer and a dye-containing light interference layer are laminated. However, these media proposed in the above publications are not good in recording characteristics, especially signal quality obtained by a light beam having a relatively short wavelength.

Japanese Patent Laid-Open No. 7-98887 discloses an example of an optical recording medium in which an additive is added to improve the recording characteristics. However, this additive is only added to the recording layer. No additive is added to a layer such as the light interference layer, which is not directly involved in recording, for improving the recording characteristics.

SUMMARY OF THE INVENTION

The present inventors found that, in an optical recording medium comprising a dye-containing recording layer and a light interference layer, a part of the light interference layer unexpectedly changes chemically or physically with heat generated when the dye in the recording layer is decomposed during recording, so that the edges of the pits are dull due to the heat history, whereby it is difficult to obtain good signals.

Therefore, an object of the present invention is to provide an optical recording medium that is capable of recording and/or reproducing information by using laser beams of two different wavelengths.

The present inventors have made tremendous studies to solve the above-mentioned problems and the present invention was thus completed. More specifically, the problems are solved by the following invention.

The present invention is:

(1) an optical recording medium comprising a recording layer, a light interference layer, a reflective layer and a protective layer that are laminated on a substrate, characterized in that said recording layer and said light interference layer comprise at least one organic dye, and that a light absorbent and/or a thermal decomposition promoter are/is added to said light interference layer;

(2) an optical recording medium described in (1) wherein said light absorbent has an attenuation coefficient k of 0.06 or larger at a recording and reproducing laser wavelength $\lambda 1$, and said thermal decomposition promoter decomposes at a lower temperature than the organic dye contained in said light interference layer to generate heat of decomposition or to generate a radical that is active to a reaction;

(3) an optical recording medium described in (2) characterized in that the information is recorded and/or reproduced by using a laser beam having a wavelength $\lambda 1$ and is also recorded and/or reproduced by using a wavelength $\lambda 2$ that is shorter by at least 80 nm than the wavelength $\lambda 1$, wherein said recording layer has a refractive index n of 1.8 or higher at $\lambda 1$ and of 1.0 or higher at $\lambda 2$ and an attenuation coefficient k ranging between 0.04 and 0.20 at $\lambda 1$ and between 0.04 and 0.7 at $\lambda 2$, and said light interference layer has a refractive index n of 1.5 or higher at $\lambda 1$ and 1.7 or higher at $\lambda 2$ and an attenuation coefficient k ranging between 0.02 and 0.15 at $\lambda 1$ and between 0.04 and 0.25 at $\lambda 2$;

(4) an optical recording medium described in (3) wherein said recording layer has the refractive index n ranging between 1.9 and 2.7 at $\lambda 1$ and between 1.0 and 1.6 at $\lambda 2$ and the attenuation coefficient k ranging between 0.04 and 0.16 at $\lambda 1$ and between 0.1 and 0.7 at $\lambda 2$, and said light interference layer has the refractive index n ranging between 1.7 and 2.2 at $\lambda 1$ and between 1.8 and 2.7 at $\lambda 2$ and the attenuation coefficient k ranging between 0.04 and 0.14 at $\lambda 1$ and between 0.04 and 0.18 at $\lambda 2$;

(5) an optical recording medium described in (3) wherein the information is recorded and reproduced by using a laser beam having the wavelength of $\lambda 1$ and also is reproduced by using a laser beam having a wavelength of $\lambda 2$;

(6) an optical recording medium described in any one of (3) to (5), wherein the wavelength $\lambda 1$ of the laser beam is selected from the range between 770 and 830 nm and the wavelength $\lambda 2$ is selected from the range between 620 and 690 nm, and wherein the reflectance is 65% or higher to the laser beam having the wavelength $\lambda 1$ and is 15% or higher to the laser beam having the wavelength $\lambda 2$, when measured through the substrate;

(7) an optical recording medium described in any one of (3) to (5), wherein the wavelength $\lambda 1$ of the laser beam is selected from the range between 770 and 830 nm and the wavelength $\lambda 2$ is selected from the range between 480 and 540 nm or between 400 and 440, and wherein the reflectance is 65% or higher to the laser beam having the wavelength $\lambda 1$ and is 15% or higher to the laser beam having the wavelength $\lambda 2$, when measured through the substrate;

(8) an optical recording medium described in (6) wherein the organic dye used for said light interference layer comprises an azo dye or a metal complex of said azo dye, the azo dye being represented by the following general formula (1):

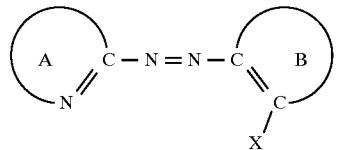

wherein A is a residue forming a heterocyclic ring along with nitrogen and carbon atoms bonded therewith; B is a residue forming an aromatic ring along with two carbon atoms bonded therewith; and X is a group having an active hydrogen;

(9) an optical recording medium described in any one of (6) to (8) wherein the organic dye used for said recording layer comprises a phthalocyanine dye represented by the following general formula (2):

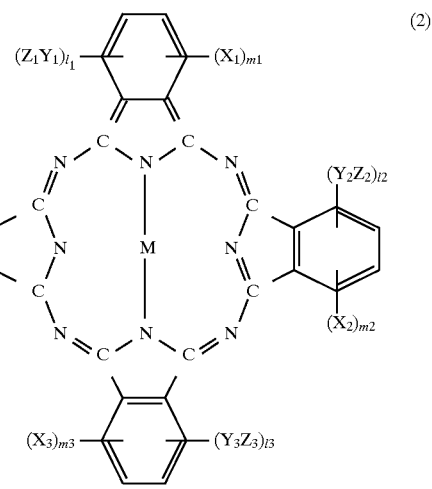

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, divalent metal, a metal oxide or a metal halide;

(10) an optical recording medium described in any one of (3) to (5), wherein the wavelength $\lambda 1$ of the laser beam is selected from the range between 620 and 690 nm and the wavelength $\lambda 2$ is selected from the range between 480 and 540 nm or between 400 and 440, and wherein the reflectance is 20% or higher to the laser beam having the wavelength $\lambda 1$ and is 15% or higher to the laser beam having the wavelength $\lambda 2$, when measured through the substrate;

(11) an optical recording medium described in any one of (3) to (5), wherein the wavelength $\lambda 1$ of the laser beam is selected from the range between 480 and 540 nm and the wavelength $\lambda 2$ is selected from the range between 400 and 440, and wherein the reflectance is 20% or higher to the laser beam having the wavelength $\lambda 1$ and is 15% or higher to the laser beam having the wavelength $\lambda 2$, when measured through the substrate; and

(12) an optical recording medium described in any one of (3) to (7) wherein said light absorbent is at least one phthalocyanine dye represented by the following general formula (3) or naphthalocyanine dye represented by the following general formula (4), and said thermal decomposition promoter is at least one selected from the group consisting of metallocene compounds such as biscyclopentadienyl complexes of Fe (ferrocene), Ti, V, Mn, Cr, Co, Ni, Mo, Ru, Rh, Zr, Lu, Ta, W, Os, Ir, Sc, Y and the like; chelate complexes such as acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

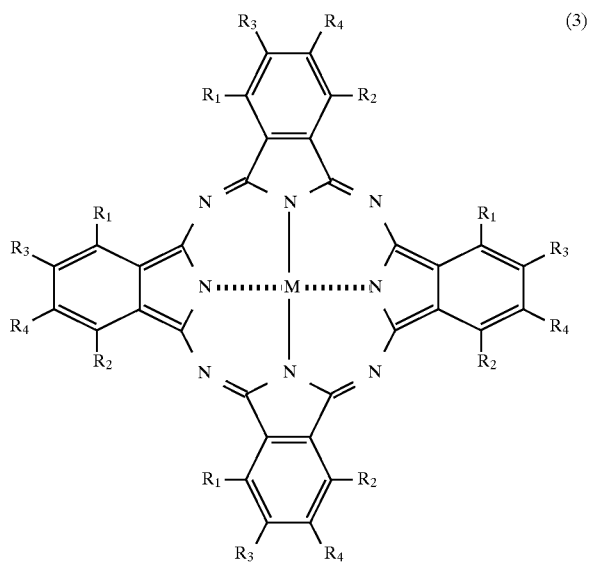

(3)

wherein $R_1$ and $R_2$ are each a linear, branched or cyclic alkoxy group having from 3 to 18 carbon atoms, provided that —$CH_2$— which is not bonded to the oxygen atom in the alkoxy groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged.

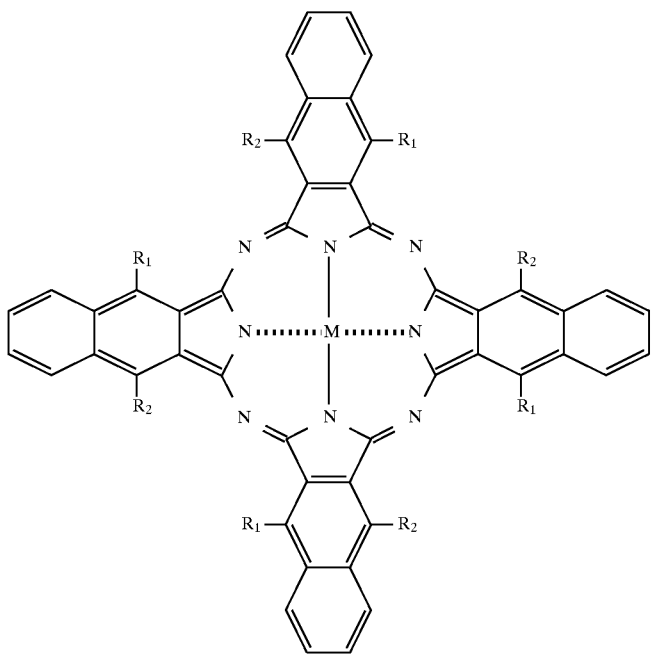

(4)

wherein $R_1$, $R_2$ and M are the same as those in the above formula 3; in which $R_1$ and $R_2$ may be interchanged.

According to the present invention, the recording characteristics can be improved in the optical recording medium which comprises the recording layer and the light interference layer each of which contains a different organic dye having the above-mentioned refractive index n and the attenuation coefficient k and which can be recorded and can reproduce information by using lasers having a wavelength within two different wavelength ranges selected from 400–440 nm, 480–540 nm, 620–690 nm and 770–830 nm by means of adding a light absorbent and/or a thermal decomposition promoter to the light interference layer. It has been observed by the present inventors that, in the optical recording medium having the recording layer and the light interference layer, the dye in the recording layer is decomposed, combusted, or deformed by the laser beam during recording and a portion of the dye used as the light interference layer also changes physically and chemically. Therefore, the light interference layer is incompletely changed to form pits.

As described above, the present invention adds a light absorbent and/or a thermal decomposition promoter to the light interference layer to promote chemical and physical change of the light interference layer due to generation of heat or decomposition thereof. It is expected that this causes formation of pits simultaneously in the recording layer and the light interference layer to improve the recording characteristics.

Recording and/or reproducing used herein means three cases: both recording and reproducing are possible at a certain wavelength, only recording is possible at a certain wavelength, and only reproducing information recorded at another wavelength is possible.

DETAILED DESCRIPTION OF THE PREFERRED EMBODIMENTS

The present invention is specifically described below in detail.

Figure 1:
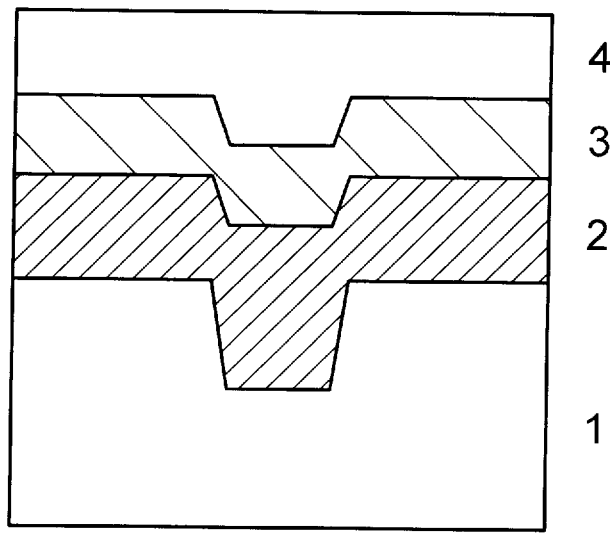
FIG. 1 is a sectional structural view illustrating layer constitution of a conventional optical recording medium.
Figure 2:
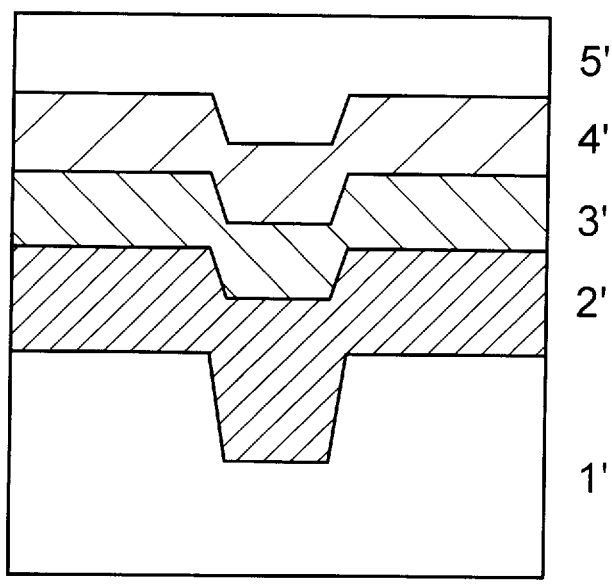
FIG. 2 is a sectional structural view illustrating layer constitution of an optical recording medium according to the present invention.
Figure 3:
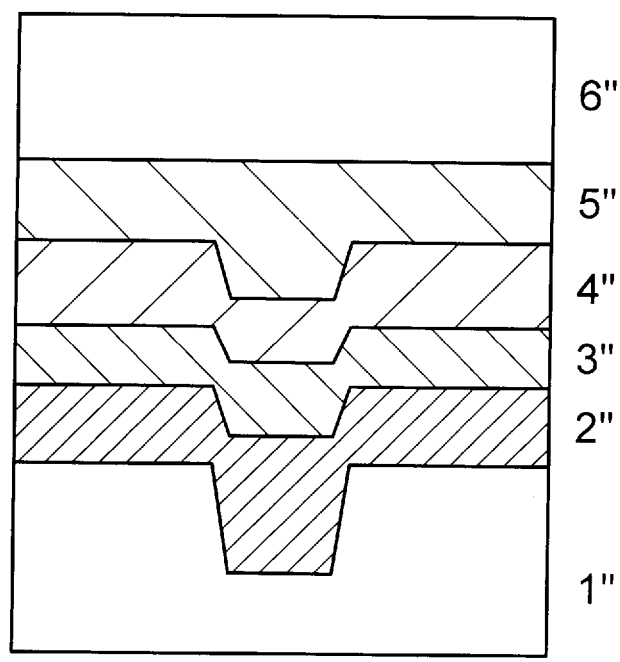
FIG. 3 is a sectional structural view illustrating layer constitution of another optical recording medium according to the present invention.

In the present invention, an optical recording medium means both a read-only optical recording medium on which information is previously recorded and an optical recording medium on which information can be recorded and from which it can be reproduced. However, description is made herein as an appropriate example in conjunction with the latter optical recording medium on which information can be recorded and from which it can be reproduced, especially an optical recording medium comprising a recording layer, a light interference layer, a reflective layer and a protective layer that are laminated on a substrate in this order as well as an optical recording medium in which a substrate is adhered to the surface of a reflective layer. These optical recording media comprise, as shown in FIG. 2, a recording layer 2' and a light interference layer 3' that are laminated on a substrate 1', to which a reflective layer 4' is adhered. A protective layer 5' covers the reflective layer 4'. The recording layer 2' and the light interference layer 3' may be in the reverse order. Alternatively, as shown in FIG. 3, a recording layer 2" and a light interference layer 3" are formed on a substrate 1", to which a reflective layer 4" is adhered. A substrate 6" is bonded thereto through an adhesive layer 5". The recording layer 2" and the light interference layer 3" may be in the reverse order.

The substrate may be basically made of any one of materials that are transparent at the wavelengths of the light beams for recording and reproducing. For example, applied are polymer materials such as polycarbonate resins, vinyl chloride resins, acrylic resins such as polymethyl methacrylate, polystyrene resins and epoxy resins, and inorganic materials such as glass. The material is molded into a disc-shape substrate by means of, for example, injection molding. If necessary, grooves may be formed on the surface of the substrate.

The organic dye contained in the recording layer used in the present invention is a dye that has the absorption maximum (λmax) at around 700 nm and has a high refractive index and a relatively small absorbance at 770–830 nm when the wavelength of a laser having the longer wavelength (λ1) is between 770 and 830 nm. Specific examples include pentamethine cyanine dyes, heptamethine cyanine dyes, squarylium dyes, azo dyes, anthraquinone dyes, naphthoquinone dyes, indophenol dyes, phthalocyanine dyes, pyrylium dyes, thiopyrylium dyes, azulenium dyes, triphenyl methane dyes, xanthene dyes, indanthrene dyes, indigo dyes, thioindigo dyes, merocyanine dyes, thiazine dyes, acridine dyes, oxazine dyes, and dithiol metal complex dyes. Preferable dyes are phthalocyanine dyes, azo dyes, cyanine dyes, and azulenium dyes. Phthalocyanine dyes are particularly preferable with respect to weather resistance and durability. Furthermore, a phthalocyanine dye represented by the following general formula (2) is most preferable in respect to the degree of modulation, the deformation of a reproduced waveform, error rate, jitter value, and deviation. The recording layer may contain two or more dyes.

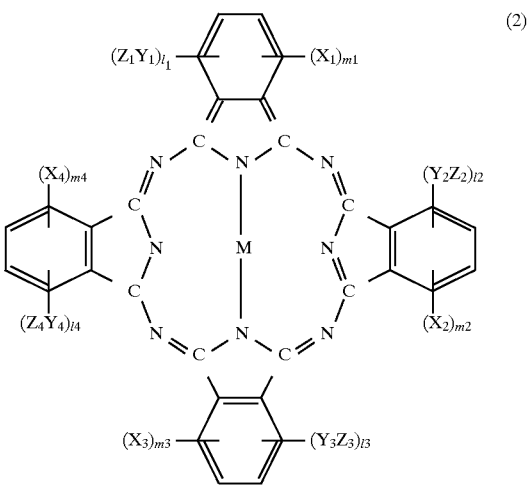

(2)

wherein M is two hydrogen atoms, a divalent metal, a metal oxide or a metal halide; $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; and $m_1$ to $m_4$ are each an integer of from 0 to 3.

Specific examples of M of the phthalocyanine dye represented by the above general formula (2) include divalent metals such as Cu, Pd, Ni, Mg, Zn, Pb, and Cd, metal oxides such as VO and metal halides such as AlCl. $Z_1$, $Z_2$, $Z_3$, and $Z_4$ are each a non-substituted or substituted hydrocarbon group having from 4 to 12 carbon atoms. Specific examples thereof include saturated hydrocarbons such as a butyl group, a pentyl group, a hexyl group, a heptyl group, an octyl group, a nonyl group, a decyl group, a dodecyl group, a cyclohexyl group and a dimethylcyclohexyl group, and unsaturated hydrocarbon groups such as a butenyl group, a hexenyl group, an octenyl group, a dodecenyl group, a phenyl group a methylphenyl group, a butylphenyl group and a hexylphenyl group. These hydrocarbons may be linear or branched. In addition, these hydrocarbons may be substituted with a halogen, an amino group or an ether group. Even in the case where the hydrocarbon is substituted with amino or ether groups, the total number of carbons in $Z_1$ to $Z_4$ is from 4 to 12. The halogen represented by $X_1$, $X_2$, $X_3$, and $X_4$ may be, for example, fluorine, chlorine, bromine and iodine.

There is no limitation to the position of the above-mentioned substituents, $X_1$ to $X_4$ and $Y_1$ to $Y_4$, bonded to the benzene ring forming phthalocyanine. In addition, four benzene rings in one molecule may have different types and numbers of substituents.

Specific examples of preferable phthalocyanine dyes are those disclosed in U.S. Pat. No. 5,124,067.

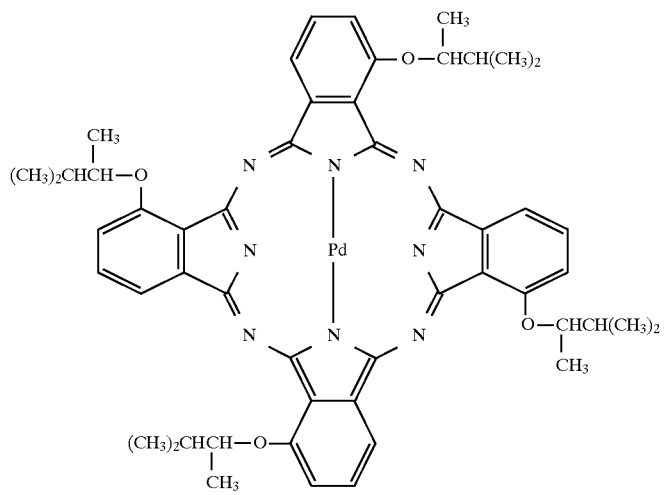
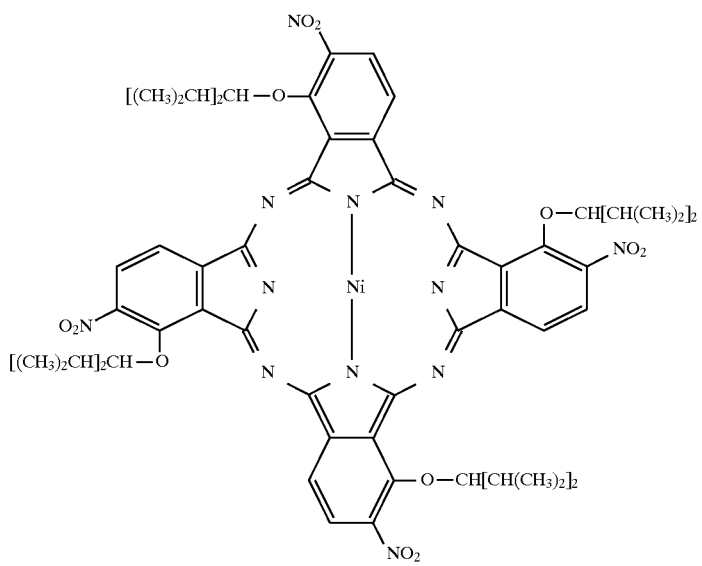
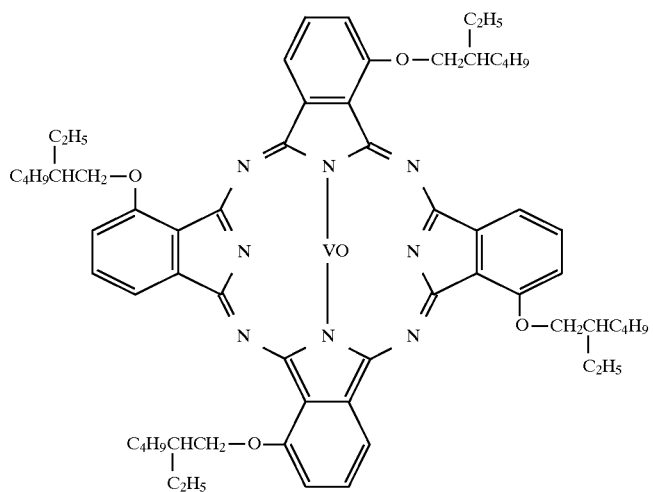

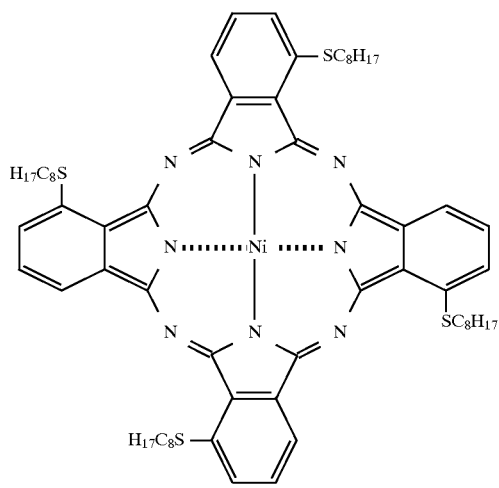
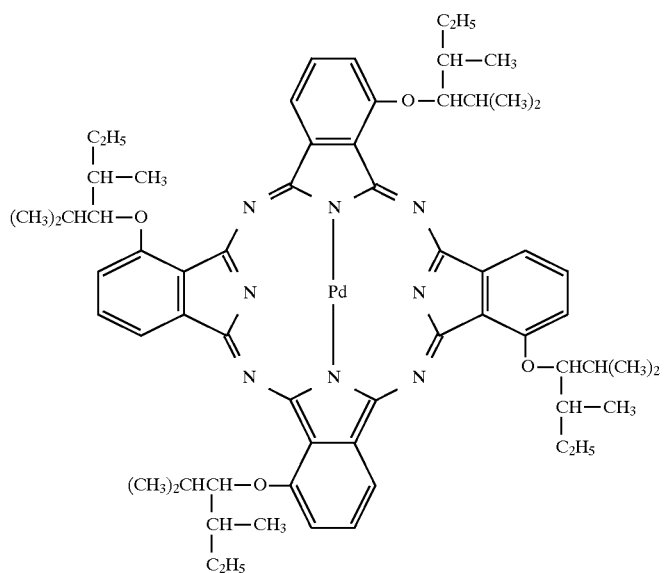
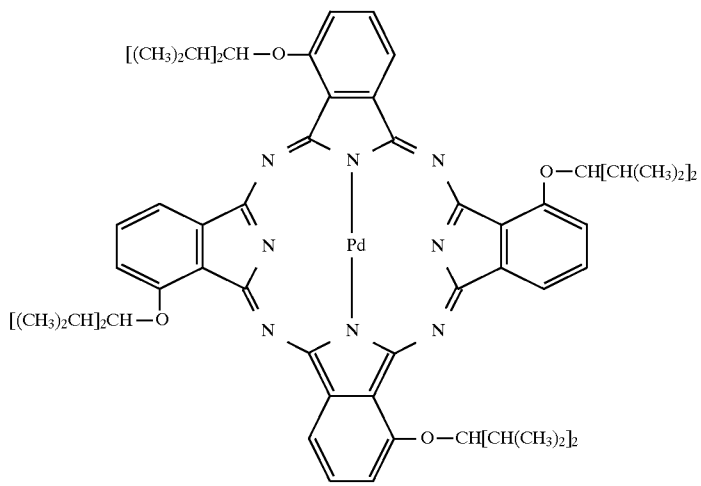

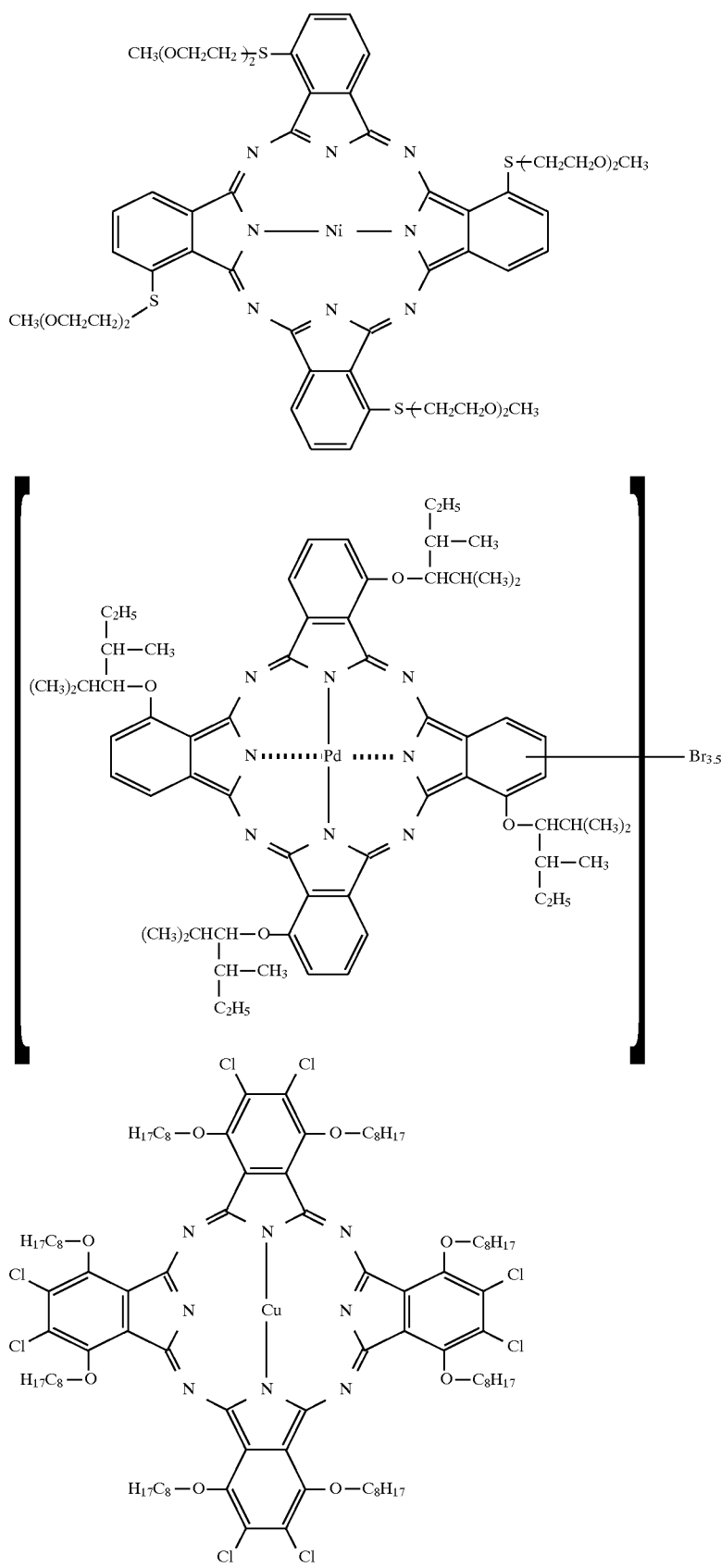

-continued
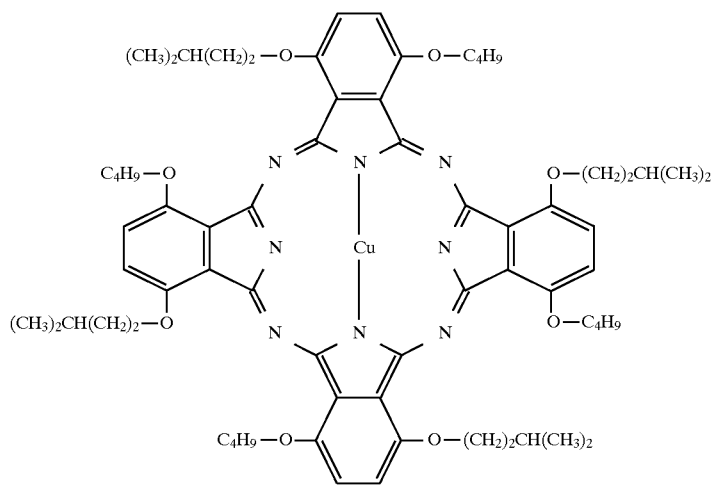
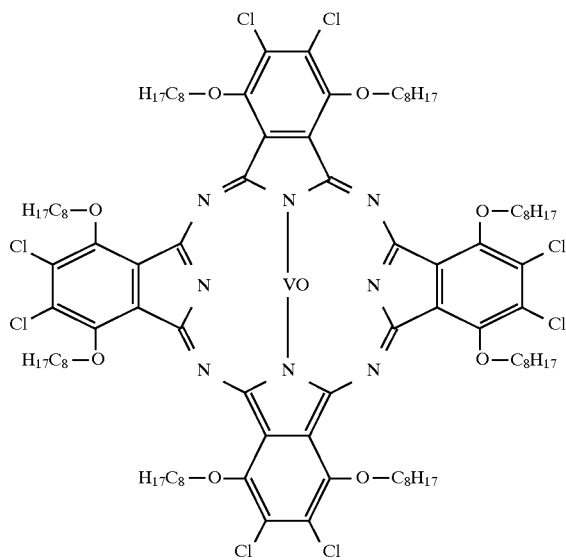
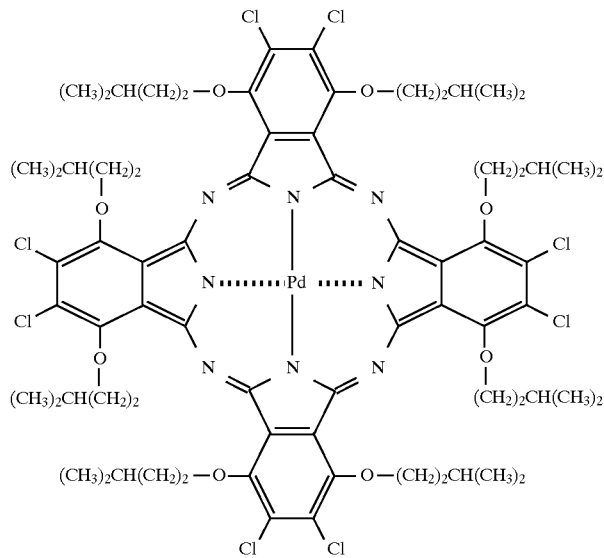

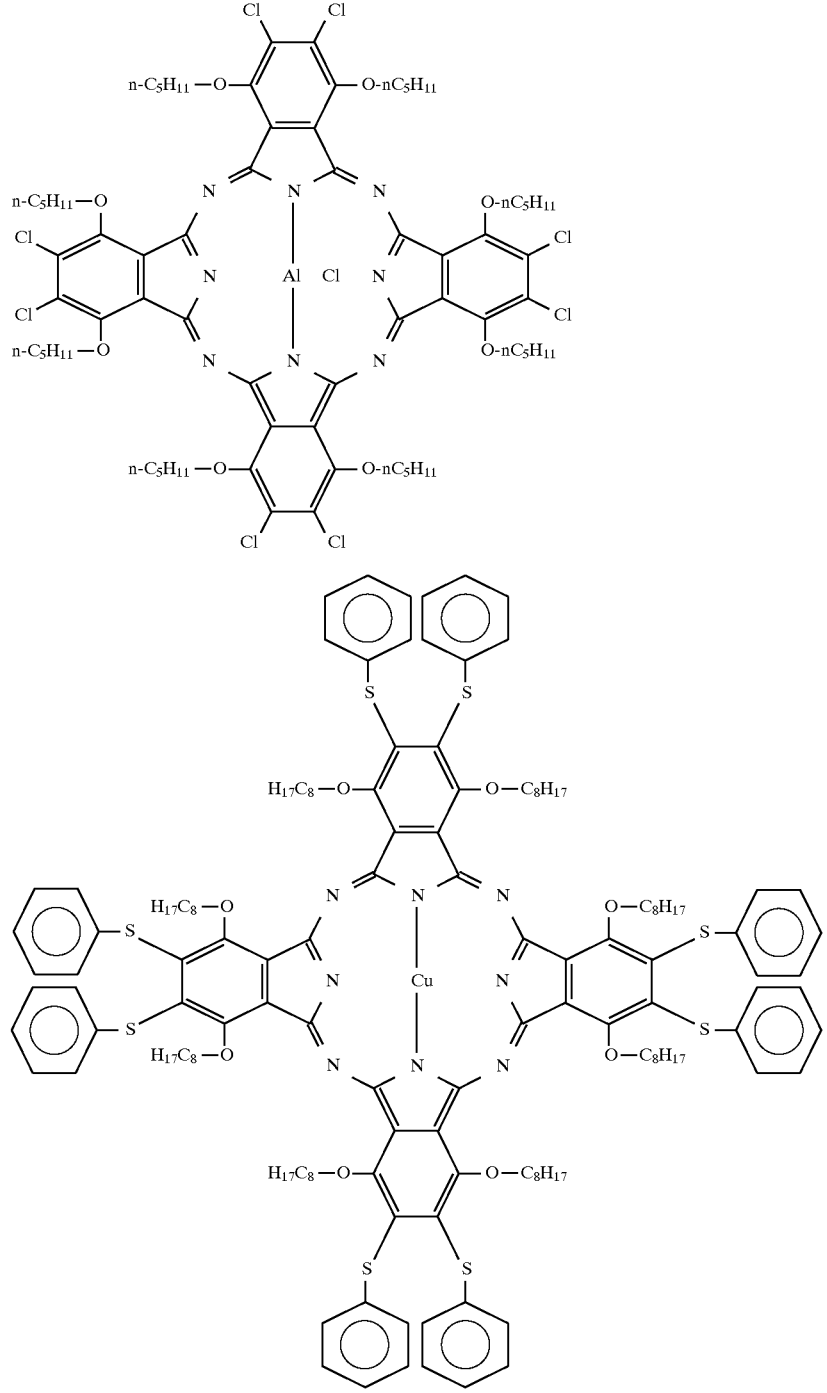

When the laser wavelength of λ1 is 620–690 nm, the dye has the absorption maximum (λmax) at around 580 nm and has a high refractive index and a small absorbance at 620–690 nm. Specific examples of such dyes include trimethine cyanine dyes, squarylium dyes, azo dyes, anthraquinone dyes, indophenol dyes, pyrylium dyes, azulenium dyes, triphenylmethane dyes, xanthene dyes, indanthrene dyes, indigo dyes, merocyanine dyes, thiazine dyes, acridine dyes, oxazine dyes, porphine dyes, azaporphine dyes and pyrromethene dyes, preferably trimethine cyanine dyes, porphine dyes, azaporphine dyes, pyrromethene dyes and azo dyes. A plurality of these dyes may be used together.

When the laser wavelength of λ1 is 480–540 nm, the dye has the absorption maximum (λmax) at around 440 nm and has a high refractive index and a small absorbance at 480–540 nm. Specific examples of such dyes include spiro dyes, ferrocene dyes, fluorene dyes, flugide dyes, imidazole dyes, thiazole dyes, perylene dyes, phenazine dyes, phenothiazine dyes, polyene dyes, indole dyes, aniline dyes, azo dyes, quinone dyes, cyanine dyes, acridine dyes, acridinone dyes, quinophthalone dyes, phenoxazine dyes, diphenylamine dyes, coumarin dyes, carbostyryl dyes, porphine dyes, squarylium dyes, oxazine dyes and pyrromethene dyes, preferably porphine dyes, quinophthalone dyes, quinone dyes, pyrromethene dyes and azo dyes. A plurality of these dyes may be used together.

The organic dye contained in the light interference layer in the present invention has an absorption maximum (λmax) at around 580 nm and has a high refractive index and a small absorbance at 620–830 nm, when the wavelength of the laser having the shorter wavelength (λ2) is between 620 and 690 nm. Specific examples of such dyes include cyanine dyes, squarylium dyes, azo dyes, naphthoquinone dyes, anthraquinone dyes, porphyrin dyes, tetraazaporphine dyes, acridine dyes, oxazine dyes, and pyrromethene dyes, preferably azo dyes, porphine dyes, cyanine dyes and pyrromethene dyes. Of these, an azo dye is preferable in respect to ease of film-making and durability. Furthermore, an azo dye represented by the following general formula (1) as well as a metal complex of said azo dye is most preferable in respect to recording characteristics. The light interference layer may contain two or more dyes:

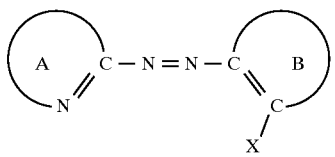

(1)

wherein A is a residue forming a heterocyclic ring along with the nitrogen and carbon atoms bonded therewith; B is a residue forming an aromatic ring along with two carbon atoms bonded therewith; and X is a group having an active hydrogen.

Specifically, the residue forming the heterocyclic ring represented by A in the azo dye represented by the above general formula (1) may be, for example, a thiazole ring, a benzothiazole ring, a pyridobenzothiazole ring, a benzopyridothiazole ring, a pyridothiazole ring, a pyridine ring, a quinoline ring, a thiadiazole ring and an imidazole ring, preferably a pyridine ring and a thiadiazole ring.

These heterocyclic rings preferably have one or more substituents. Specific examples of the substituents include an alkyl group, a halogenated alkyl group, an aryl group, an alkoxy group, a halogenated alkoxy group, an aryloxy group, an alkylthio group, a halogenated alkylthio group, an arylthio group, an aralkyl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group and a vinyl group. These substituents may optionally have a substituent or substituents. Examples of the preferable substituent for the heterocyclic ring include an alkyl group having from 1 to 15 carbon atoms and optionally having a substituent or substituents, a fluoroalkyl group having from 1 to 15 carbon atoms and optionally having a substituent or substituents, an alkoxy group having from 1 to 25 carbon atoms and optionally having a substituent or substituents, a halogen atom, a cyano group, a nitro group, an alkylthio group having from 1 to 15 carbon atoms and optionally having a substituent or substituents, a fluoroalkylthio group having from 1 to 15 carbon atoms and optionally having a substituent or substituents, an alkylsulfamoyl group having from 1 to 15 carbon atoms and optionally having a substituent or substituents, a phenylsulfamoyl group having from 6 to 20 carbon atoms and optionally having a substituent or substituents, a phenylazo group optionally having a substituent or substituents, a pyridinoazo group optionally having a substituent or substituents, an ester group having from 2 to 16 carbon atoms, a carbamoyl group having from 2 to 16 carbon atoms, an acyl group having from 2 to 16 carbon atoms, an acylamino group having from 2 to 15 carbon atoms, a sulfonamide group having from 1 to 15 carbon atoms, —NR$_5$R$_6$ (R$_5$ and R$_6$ are each independently a hydrogen atom, an alkyl group having from 1 to 15 carbon atoms and optionally having a substituent or substituents, or a phenyl group optionally having a substituent or substituents, in which R$_5$ and R$_6$ optionally form a five- or six-membered ring), a hydroxyl group, —CR$_7$=C(CN)R$_8$ (R$_7$ is a hydrogen atom or an alkyl group having from 1 to 6 carbon atoms, and R$_8$ is a cyano group or an alkoxycarbonyl group having from 2 to 7 carbon atoms). The above-mentioned alkyl moiety may be sulfonated, nitrated, cyanated, halogenated, acetylated or hydroxylated.

Examples of the residue forming the aromatic ring represented by B in the general formula (1) include a benzene ring, a naphthalene ring, a pyridone ring, a pyridine ring, and a pyrazole ring, preferably a benzene ring, more preferably a benzene ring substituted with at least one electron denoting group. Examples of such substituent include an alkyl group, a halogenated alkyl group, an aryl group, an alkoxy group, a halogenated alkoxy group, an aryloxy group, an alkylthio group, a halogenated alkylthio group, an arylthio group, an aralkyl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group and a vinyl group. These substituents optionally have a substituent or substituents. Preferable examples of the substituent for the aromatic ring include an alkyl group having from 1 to 15 carbon atoms and optionally having a substituent or substituents, a fluoroalkyl group having from 1 to 15 carbon atoms and optionally having a substituent or substituents, alkoxy group having from 1 to 25 carbon atoms and optionally having a substituent or substituents, a halogen atom, a cyano group, a nitro group, an alkylthio group having from 1 to 15 carbon atoms and optionally having a substituent or substituents, a fluoroalkylthio group having from 1 to 15 carbon atoms and optionally having a substituent or substituents, an alkylsulfamoyl group having from 1 to 15 carbon atoms and optionally having a substituent or substituents, a phenylsulfamoyl group having from 6 to 20 carbon atoms and optionally having a substituent or substituents, a phenylazo group optionally having a substituent or substituents, a pyridinoazo group optionally having a substituent or substituents, an ester group having from 2 to 16 carbon atoms, a carbamoyl group having from 2 to 16 carbon atoms, an acyl group having from 2 to 16 carbon atoms, an acylamino group having from 1 to 15 carbon atoms, a sulfonamide group having from 1 to 15 carbon atoms, —NR$_5$R$_6$ (R$_5$ and R$_6$ are each independently a hydrogen atom, an alkyl group having from 1 to 15 carbon atoms and optionally having a substituent or substituents, or a phenyl group optionally having a substituent or substituents, in which R$_1$ and R$_2$ optionally form a five- or six-membered ring), a hydroxyl group, —CR$_7$=C(CN)R$_8$ (R$_7$ is a hydrogen atom or an alkyl group having from 1 to 6 carbon atoms, and R$_8$ is a cyano group or an alkoxycarbonyl group having from 2 to 7 carbon atoms). Particularly preferable examples of the electron donative group include a monoalkylamino group having from 1 to 8 carbon atoms and optionally having a substituent or substituents, a dialkylamino group having from 2 to 8 carbon atoms and optionally having a substituent or substituents, an alkoxyl group having from 1 to 8 carbon atoms and optionally having a substituent or substituents, an alkyl group having from 1 to 8 carbon atoms and optionally having a substituent or substituents, an aryloxy group having from 6 to 12 carbon atoms and optionally having a substituent or substituents, an aralkyl group having from 7 to 12 carbon atoms and optionally having a substituent or substituents, a carbamoyl group, an amino group, and a hydroxyl group. The above-mentioned alkyl moiety may be sulfonated, nitrated, cyanated, halogenated, acetylated, or hydroxylated.

The group X of the azo dye represented by the general formula (1) may be any group and is not limited to a specific one as long as it has an active hydrogen. Preferable examples of the group X include —OH, —COOH, —$SO_3H$, —$B(OH)_2$, —$NHSO_2R_9$ ($R_9$ is a hydrogen atom, an alkyl group having from 1 to 25 carbon atoms and optionally having a substituent or substituents, or a phenyl group optionally having a substituent or substituents), —$CONH_2$, —$SO_2NH_2$ and —$NH_2$. Particularly preferable groups are —OH, —COOH, —$SO_3H$, —$NHSO_2R_9$ ($R_9$ is the same as above). When X is a group to be dissociated into an anion such as —OH, —COOH and —$SO_3H$, this group may be used as a salt with a cation, while it may be used as it is, to form an azo metal complex compound. Examples of the cation applicable include inorganic cations such as $Na^+$, $Li^+$ and $K^+$, and organic cations such as $P^+(C_6H_5)_4$, $N^+(C_2H_5)_4$, $N^+(C_4H_9)_4$ and $C_6H_5N^+(CH_3)_3$.

In the present invention, the above-mentioned azo dyes are used in the form of a metal complex. The metal having a capability of forming a complex with the azo dye may preferably be, for example, transition metals such as Ni, Co, Fe, Ru, Rh, Pd, Cu, Zn, Mn, Os, Ir and Pt. Of these, Ni, Co, Cu, Pd, Mn and Zn are more preferable. These metals are used in the form of acetate, halide or $BF_4^+$ salt, and are coordinated to an azo dye in the form of $Ni_2^+$, $Co_2^+$, $Co_3^+$, $Cu_2^+$, $Pd_2^+$, $Mn_2^+$ and $Zn_2^+$ to form a complex. The azo-metal complex compound may be used alone, or in combination of two or more such compounds.

The metal complex of the azo dye used in the present invention can be synthesized according to a method disclosed in, for example, Furukawa: "Analytica Chemica Acta 140 (1982)", pp. 281–289.

Preferable examples of the metal complex of the azo dye used in the present invention include metal complexes of $Ni^{2+}$, $Co^{2+}$, $Co^{3+}$, $Cu^{2+}$, $Pd^{2+}$, $Mn^{2+}$ and $Zn^{2+}$ with azo dyes such as:

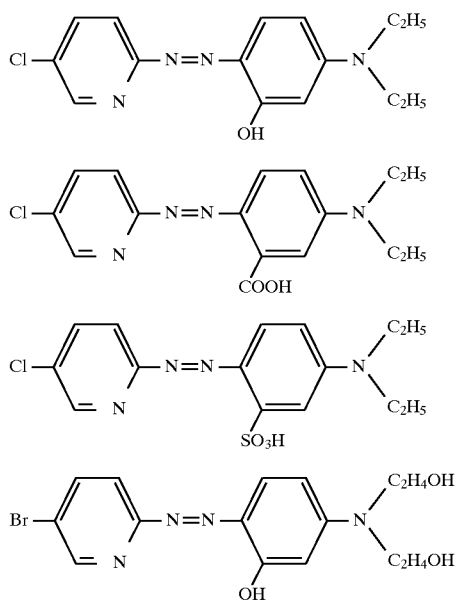

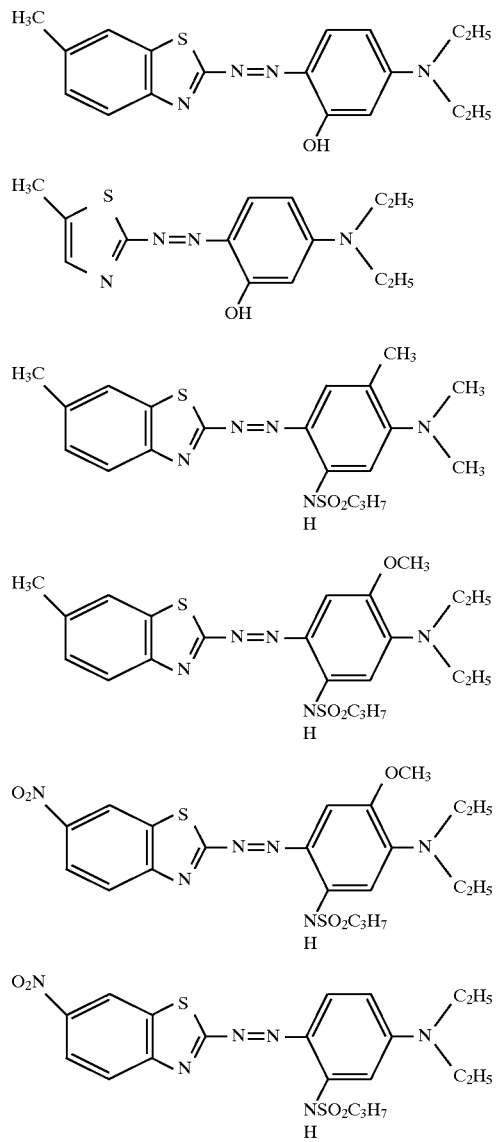

In addition, the examples also include compounds disclosed in Japanese Patent Publication No. 5-67438 (U.S. Pat. No. 4,686,143) and tables 1 to 9 of International Patent Application No. WO91/18950 (U.S. Pat. Nos. 5,330,542, 5,389,419).

When the laser wavelength of λ2 is between 480 and 540 nm, the dye has the absorption maximum (λmax) at around 440 nm and has a high refractive index and a small absorbance at 480–540 nm. Specific examples of such dyes include spiro dyes, ferrocene dyes, fluorene dyes, flugide dyes, imidazole dyes, thiazole dyes, perylene dyes, phenazine dyes, phenothiazine dyes, polyene dyes, indole dyes, aniline dyes, azo dyes, quinone dyes, cyanine dyes, acridine dyes, acridinone dyes, quinophthalone dyes, phenoxazine dyes, diphenylamine dyes, coumarin dyes, carbostyryl dyes, porphine dyes, oxazine dyes and pyrromethene dyes, preferably porphine dyes, quinophthalone dyes, quinone dyes, pyrromethene dyes, cyanine dyes or azo dyes. A plurality of these dyes may be used together.

When the laser wavelength of λ2 is between 400 and 440 nm, the dye has the absorption maximum (λmax) at around 350 nm and has a high refractive index and a small absorbance at 400–440 nm. Specific examples of such dyes include spiro dyes, stilbene dyes, fluorene dyes, imidazole dyes, perylene dyes, phenazine dyes, phenothiazine dyes, polyene dyes, quinone dyes, cyanine dyes, acridine dyes, acridinone dyes, coumarin dyes, carbostyryl dyes, porphine dyes and squarylium dyes, preferably polyene dyes, stilbene dyes and quinone dyes. A plurality of these dyes may be used together.

The light absorbent added to the light interference layer in the present invention is not limited specifically as long as it has an attenuation coefficient of at least 0.06 to a laser beam having the longer wavelength ($\lambda 1$) and has an attenuation coefficient of at least 0.6 to a laser beam having the shorter wavelength ($\lambda 2$) and heat or heat of decomposition is generated after absorption of a light beam.

Specific examples of the light absorbent include cyanine dyes, squarylium dyes, azo dyes, anthraquinone dyes, naphthoquinone dyes, indophenol dyes, phthalocyanine dyes, naphthalocyanine dyes, tetraazaporphine dyes, pyrylium dyes, thiopyrylium dyes, azulenium dyes, triphenylmethane dyes, xantene dyes, indanthrene dyes, indigo dyes, thioindigo dyes, merocyanine dyes, thiazine dyes, acridine dyes, oxazine dyes and dithiol metal complex dyes, when the recording is made with the laser beam having a wavelength selected from between 620 and 690 nm and between 770 nm and 830 nm. When the laser beam having the wavelength $\lambda 1$ is selected from between 770 and 830 nm, the phthalocyanine dye and the naphthalocyanine dyes are preferable. Of phthalocyanine dyes represented by the above general formula (2), a phthalocyanine dye having the following general formula (3) or a naphthalocyanine dye represented by the following general formula (4) is particularly preferable. Examples thereof are given in Table 1 below. Two or more dyes may be mixed with each other. The light absorbent may also be added to the recording layer.

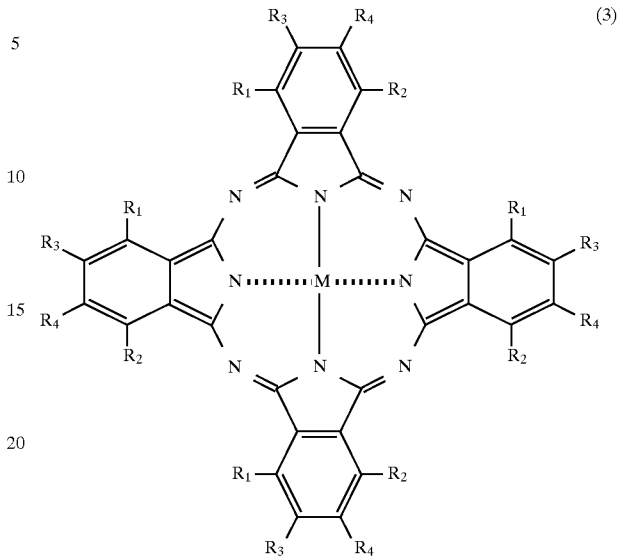

(3)

wherein $R_1$ and $R_2$ are each a linear, branched or cyclic alkoxyl group having from 3 to 18 carbon atoms, provided that —$CH_2$— which is not bonded to the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged.

(4)

wherein $R_1$, $R_2$ and M are the same as those in the above formula 3; in which $R_1$ and $R_2$ may be interchanged.

TABLE 1

| | skeleton | M | $R_1$ | $R_2$ | $R_3$ | $R_4$ |
|---|---|---|---|---|---|---|
| Compound (1) | phthalocyanine | Pd | $OC_2H_4OC_2H_5$ | ← | H | H |
| Compound (2) | ↑ | ↑ | ↑ | ← | Cl | H |
| Compound (3) | ↑ | ↑ | ↑ | ← | Cl | Cl |
| Compound (4) | ↑ | ↑ | ↑ | $OC_2H_4OC_2H_4OCH_3$ | ↑ | ↑ |
| Compound (5) | ↑ | Cu | ↑ | ← | ↑ | ↑ |
| Compound (6) | ↑ | Pd | $OCH(CH_3)OCH_3$ | ← | ↑ | ↑ |
| Compound (7) | ↑ | ↑ | ↑ | ← | H | H |
| Compound (8) | ↑ | Cu | ↑ | ← | H | H |
| Compound (9) | ↑ | ↑ | $OC_2H_4OC_2H_4OCH_3$ | ← | H | H |
| Compound (10) | ↑ | Pd | A | ← | Cl | Cl |
| Compound (11) | ↑ | ↑ | B | Br | H | H |
| Compound (12) | ↑ | Cu | C | H | H | H |
| Compound (13) | ↑ | VO | ↑ | H | H | H |
| Compound (14) | ↑ | Cu | D | H | H | H |
| Compound (15) | ↑ | VO | ↑ | H | H | H |
| Compound (16) | Naphthalocyanine | Pd | $OC_2H_4OC_2H_4OC_2H_4OC_2H_5$ | H | | |
| Compound (17) | ↑ | ↑ | ↑ | OH | | |
| Compound (18) | ↑ | Cu | ↑ | H | | |

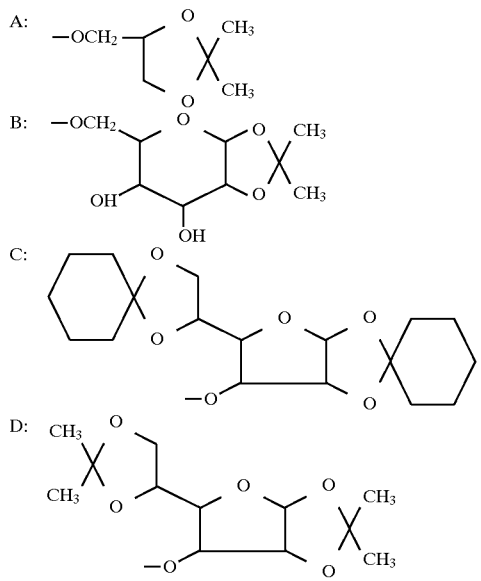

When recording is made with the laser beam having a wavelength of 400–440 nm or 480–540 nm, examples of the dye include spiro dyes, ferrocene dyes, fluorene dyes, flugide dyes, imidazole dyes, thiazole dyes, perylene dyes, phenazine dyes, phenothiazine dyes, polyene dyes, indole dyes, aniline dyes, azo dyes, quinone dyes, cyanine dyes, acridine dyes, acridinone dyes, quinophthalone dyes, phenoxazine dyes, diphenylamine dyes, coumarin dyes, carbostyryl dyes and porphine dyes. A plurality of these dyes may be used together. The light absorbent may also be added to the recording layer.

The organic dye and the light absorbent used in the light interference layer are typically mixed with each other at a mixing ratio of 1:1 to 10:1 by weight. The light absorbent cannot provide its effect when it is used in a significantly small amount. Too much light absorbent may deteriorate the role of the light interference layer. In this respect, the mixing ratio is preferably within the range of 3:1 to 7:1 by weight.

The thermal decomposition promoter in the present invention preferably decomposes at a lower temperature than the light interference layer does, and generates a large heat of decomposition or generates a radical that is active to a reaction.

Examples of the thermal decomposition promoter include lead-based compounds such as tetraethyl lead and tetramethyl lead that are a metal anti-knocking agent; Mn-based compounds such as cymantrene $(Mn(C_5H_5H_5)(CO)_3)$; metallocene compounds such as biscyclopentadienyl complexes of Fe (ferrocene), Ti, V, Mn, Cr, Co, Ni, Mo, Ru, Rh, Zr, Lu, Ta, W, Os, Ir, Sc, Y and the like. Of these, ferrocene, ruthenocene, osmocene, nickelocene, titanocene and derivatives thereof have a good thermal decomposition effect. Besides metallocene, examples include organic acid metal compounds such as formic acid metal compounds, oxalic acid metal compounds, lauryl acid metal compounds, naphthenic acid metal compound, stearic acid metal compounds and butyric acid metal compounds; chelate complexes such as acetyl acetonato complexes, phenanthroline complexes, bispyridine complexes, ethylenediamine complexes, ethylenediamine tetraacetic acid complexes, diethylene triamine complexes, diethylene glycol dimethylether complexes, diphosphino complexes and dimethyl glyoxymato complexes; metal complexes such as carbonyl complexes, cyano complexes, and amine complexes; metal halide compounds, or inorganic metal salts such as nitric acid metal compounds, sulfuric acid metal complexes, and metal oxide compounds. The metal compound used herein is preferably soluble in an organic solvent and has good wet heat resistance and light resistance. In particular, the acetyl acetonato complexes and the carbonyl complexes are preferable because of their good solubility. The metal is preferably iron, cobalt or chromium. Of the above-mentioned thermal decomposition promoters, organometal complexes such as metallocene are particularly preferable. Besides, nitrocellulose may be used. If necessary, the thermal decomposition promoter may be introduced with substituents and may be added with additives such as a binder. Alternatively, two or more thermal decomposition promoters may be mixed together. The thermal decomposition promoter may be added to the recording layer.

A mixing ratio of the organic dye and the thermal decomposition promoter used in the light interference layer is typically in the range of 1:0.1 to 1:10 by mole. The thermal decomposition promoter cannot provide its effect when it is used in a significantly small amount. Too much thermal decomposition promoter may deteriorate roles of the light interference layer. In this respect, the mixing ratio is preferably within the range of 1:0.5 to 1:1.5 by mole.

In producing the recording and light interference layers, metallocene compounds such as biscyclopentadienyl metal complexes, resins such as ethyl cellulose, acrylic resins, polystyrene resins and urethane resins, and additives such as leveling agents and defoaming agents may be added to the extent that the effects of the present invention are not deteriorated.

In addition, quenchers and ultraviolet ray absorbents may be mixed or introduced as a substituent, if necessary.

The recording and light interference layers have a content of the organic dye of 30% or higher, preferably 60% or higher.

Optical constants are represented by a complex refractive index (n+ki) in the present invention. In the equation, n and k are coefficients that correspond to a real part and an imaginary part, respectively, and n is a refractive index and k is an attenuation coefficient.

Typical organic dyes have such a feature that the refractive index n and the attenuation coefficient k change significantly depending on a wavelength $\lambda$. Using this feature, the light interference layer is deposited by using an organic dye or dyes having a suitable optical constant to each laser wavelength. This provides a high reflectance at various wavelengths of laser beams.

When taken the properties of the organic dyes into consideration, the optical constants of the recording layer are as follows: n is 1.8 or larger, preferably from 1.9 to 2.7 and k is from 0.04 to 0.20, preferably from 0.04 to 0.16 at the wavelength $\lambda 1$. At the wavelength $\lambda 2$, n is 1.0 or larger, preferably from 1.0 to 1.6, and k is from 0.04 to 0.7, preferably from 0.1 to 0.7. The optical constant of the light interference layer are as follows: n is 1.5 or larger, preferably from 1.7 to 2.2, and k is from 0.02 to 0.15, preferably from 0.04 to 0.14, at the wavelength $\lambda 1$. At the wavelength $\lambda 2$, n is 1.7 or larger, preferably from 1.8 to 2.7, and k is from 0.04 to 0.25, preferably from 0.04 to 0.18. Furthermore, it is preferable that an average of the refractive index in the recording layer and the one in the light interference layer and an average of the attenuation coefficients in both layers are from 1.8 to 2.4 and from 0.04 to 0.16, respectively, at the wavelength $\lambda 1$ and that the averages of the refractive indexes and the attenuation coefficients are from 1.5 to 2.1 and from 0.08 to 0.3, respectively, at the wavelength $\lambda 2$.

A major role of the light interference layer is to improve the reflectance at each wavelength of the laser.

Next, a process for production according to the present invention is described.

The above-mentioned compound or dye is applied to a substrate in a thickness of from 30 to 300 nm, preferably from 50 to 150 nm by means of coating such as spin-coating and casting, sputtering, chemical vapor deposition, or vacuum deposition to form a recording layer or a light interference layer. When the film thickness of the recording layer is significantly smaller than 30 nm, recording may be impossible due to large diffusion of heat, or a distortion is caused in the recorded signals and the signals have small amplitude, which does not satisfy any CD standards. On the contrary, when the film thickness is significantly larger than 300 nm, the reflectance decreases to deteriorate the properties of the reproduced signals. When the film thickness of the light interference layer is significantly smaller than 30 nm, no effect is produced to improve the reflectance because of poor light enhancing effect. Furthermore, it is desirable that the thickness of the light interference layer satisfies the following equation and adopts a value at which the reflectance becomes high at each laser wavelength:

$$0.6 \times \lambda/4n < d < 1.5 \times \lambda/4n$$

wherein $\lambda$ is a laser wavelength, n is a refractive index of the light interference layer and d is a film thickness of the light interference layer.

For the coating, a coating solvent is used into which the dye is dissolved or dispersed. It is preferable to choose the solvent that does not damage the substrate. Examples of such solvent include alcohol solvents such as methyl alcohol, ethyl alcohol, propyl alcohol, butyl alcohol, allyl alcohol, furfuryl alcohol, methyl cellosolve, ethyl cellosolve and tetrafluoropropanol; aliphatic or alicyclic hydrocarbon solvents such as hexane, heptane, octane, decane, cyclohexane, methyl cyclohexane, dimethyl cyclohexane, trimethyl cyclohexane and propyl cyclohexane; aromatic hydrocarbon solvents such as toluene, xylene and benzene; halogenated hydrocarbon solvents such as carbon tetrachloride and chloroform; ether solvents such as diethyl ether, dibutyl ether, diisopropyl ether, dioxane and tetrahydrofuran; ketone solvents such as acetone; ester solvents such as ethyl acetate; and water. The solvent may be used alone or in a mixture of two or more solvents.

It is preferable that an organic dye used for the recording layer and that for the light interference layer are dissolved into solvents having different polarities, i.e. a dye is soluble in a solvent having one polarity and not soluble in a solvent having the other polarity to avoid any damages to the first layer when applying the second layer. For example, the dye used for one layer is dissolved into a solvent having a high polarity, such as alcohol solvents and water, and the dye used for the other layer is dissolved into a solvent having a low polarity, such as aliphatic or alicyclic hydrocarbon solvents, aromatic hydrocarbon solvents, carbon tetrachloride or ether solvents, to be coated. It is particularly preferable that as for the solvent used for depositing each dye layer, an aliphatic or alicyclic hydrocarbon solvent and a mixed solvent thereof with another solvent, as well as an alcohol solvent and a mixed solvent thereof with another solvent, are used in combination with dyes soluble thereto in order to reduce damages to the resin substrate or effects to other layers.

The solubility of an organic dye in a coating solvent can be improved by means of introducing an appropriate substituent into the molecule of the dye. The dye may be improved to have a larger solubility in the solvents having a low polarity by means of introducing, for example, the following substituents: an alkyl group, an alkenyl group, an alkoxyl group, an alkylallyl group, an alkylcarbonyl group, an alkoxycarbonyl group, an alkylamino group, an alkylimino group, an alkylcarboxyamide group, an alkanoylimino group, an alkylsulfanyl group, alkylsulfenyl group and alkylsulfonamide group. On the other hand, a dye may also be improved to have a larger solubility to the solvents having a high polarity by means of introducing, for example, the following substituents: a group having an amino end, a carboxyl end, a carbamoyl end, a mercapto end, a mercapto amino end, a sulfamoyl end, a sulfonic acid end, and a sulfoamino end. The dye may be dispersed into a thin polymer film for the recording layer.

When no solvent can be selected that does not damage the substrate, sputtering, chemical vapor deposition and vacuum deposition are useful.

A light absorbent and a thermal decomposition promoter should be dissolved into a solvent that is used to apply the dye for the light interference layer.

Next, a reflective layer is formed on the recording or light interference layer so as to have a film thickness of from 50 to 300 nm, preferably from 100 to 150 nm. Preferable examples of the material of the reflective layer include those having a high reflectance at a wavelength of the light beams used for reproducing, e.g., metals such as Au, Al, Ag, Cu, Ti, Cr, Ni, Pt, Ta and Pd, and alloys containing these metals. Of these, Au, Al and Ag are suitable as the material of the reflective layer because of their high reflectance. Besides the above, the following may be included: metals or metalloides such as Mg, Se, Hf, V, Nb, Ru, W, Mn, Re, Fe, Co, Rh, Ir, Cu, Zn, Cd, Ga, In, Si, Ge, Te, Pb, Po, Sn and Bi. In addition, those containing Au as a major component are suitable because a reflective layer having a high reflectance can be obtained easily. The major component used herein means those having the content of 50% or higher. Furthermore, it is also possible to laminate alternatively thin films having a low refractive index and those having a high refractive index by using a material other than metals to form a multi-layer structure, which is used as the reflective layer.

The reflective layer may be formed by means of, for example, sputtering, ion plating, chemical vapor deposition and vacuum deposition. A reflex amplifying layer and an adhesive layer may be provided between the recording layer and the reflective layer in order to improve the reflectance and adhesion, respectively.

A protective layer is formed on the reflective layer. There is no limitation to the material of the protective layer as long as it can protect the reflective layer from an external force. Examples of applicable organic materials include thermoplastic resins, thermosetting resins, electron beam curing resins and ultraviolet curing resins. Examples of applicable inorganic materials include $SiO_2$, $Si_3N_4$, $MgF_2$ and $SnO_2$. The thermoplastic resins and the thermosetting resins may be dissolved into an adequate solvent to prepare a coating solution, which is then coated on the reflective layer and dried to form a protective layer. The ultraviolet curing resins may be used as they are or may be dissolved into an adequate solvent to prepare a coating solution. The coating solution is then applied on the reflective layer, to which an ultraviolet ray is irradiated to cure the resin, thereby forming a protective layer. Examples of the ultraviolet resin include acrylate resins such as urethane acrylate, epoxy acrylate and polyester acrylate. These resins may be used alone or in the form of a mixture. Furthermore, the resin may be laminated into a multi-layer structure rather than a single layer.

The protective layer may be formed by means of, for example, coating such as spin-coating and casting, sputtering, and chemical vapor deposition, as in the recording layer. Of these, spin-coating is preferable.

A protective layer typically has a film thickness of from 0.1 to 100 micrometers, and the protective layer in the present invention has a film thickness of from 3 to 30 micrometers, preferably from 5 to 20 micrometers.

A label may be further printed on the protective layer.

A protective sheet or a substrate may be adhered to a reflective surface of the reflective layer. Alternatively, two optical recording media may be adhered with the reflective surfaces of the reflective layers arranged oppositely to face to each other.

The laser used in the present invention may be any one of adequate lasers that has a wavelength of from 400 to 440 nm, from 480 to 540 nm, from 620 to 690 nm and from 770 to 830 nm. For example, applicable lasers include a dye laser of which wavelength can be selected within the range of the visible region, a YAG higher harmonic wave conversion laser having the wavelength of 532 nm, higher harmonic wave conversion lasers having the wavelengths of 430 nm or 425 nm, respectively, a helium neon laser having the wavelength of 633 nm, infrared semiconductor lasers having the wavelengths of 635 nm, 650 nm, or 680 nm, respectively, and near infrared lasers having the wavelengths of from 770 to 830 nm. Taking account of mounting it on a device, semiconductor lasers are suitable.

EXAMPLES

The examples of the present invention shall be described below, but the present invention shall not be restricted by those specific examples.

Example 1

Dye solution 1 is prepared in which 0.25 g of phthalocyanine compound represented by the formula (5) is dissolved in 10 ml of dimethyl cyclohexane. A substrate used was a polycarbonate resin substrate of a disc shape having a thickness of 1.2 mm and a diameter of 120 mm$\phi$ and having a spiral pre-groove formed in the surface thereof (track pitch: 1.6 $\mu$m). The dye solution was coated on the surface of the substrate by spin coating at a rotation speed of 1,600 rpm to form a layer. The layer was dried at 70° C. for 2 hours to provide a recording layer having a film thickness of 80 nm. For the optical constants of this recording layer, the refractive index n was 2.2 and the attenuation coefficient k was 0.08 at a wavelength of 780 nm. The refractive index n and the attenuation coefficient k were 1.2 and 0.50, respectively, at a wavelength of 680 nm. The refractive index n and the attenuation coefficient k were 1.2 and 0.51, respectively, at a wavelength of 650 nm. The refractive index n and the attenuation coefficient k were 1.1 and 0.34, respectively, at a wavelength of 635 nm.

Furthermore, 0.2 g of azo compound represented by the formula (6) was mixed with the compound (5) in Table 1 as a light absorbent such that a weight ratio thereof was 5:1. The mixture was then dissolved in 10 ml of 2,2,3,3-tetrafluoro-1-propanol to prepare dye solution 2. The dye solution 2 was spin-coated on the recording layer at a rotation speed of 1,500 rpm to form a layer. This layer was dried at 70° C. for 2 hours to form a light interference layer having a film thickness of 80 nm. For the optical constants of this light interference layer, the refractive index n and the attenuation coefficient k were 2.0 and 0.09, respectively, at a wavelength of 780 nm. The refractive index n and the attenuation coefficient k were 2.1 and 0.09, respectively, at a wavelength of 680 nm. The refractive index n and the attenuation coefficient k were 2.2 and 0.08, respectively, at a wavelength of 650 nm. The refractive index n and the attenuation coefficient k were 2.3 and 0.11, respectively, at a wavelength of 635 nm. The attenuation coefficient k of the compound (5) was 0.20 at a wavelength of 780 nm.

Then, an Au film was formed by sputtering on the light interference layer by using a sputtering device CDI-900

(available from Balzers, Co.) to form a reflective layer having a film thickness of 100 nm. Argon gas was used as sputtering gas. Sputtering conditions were: sputtering power of 2.5 kW and sputtering gas pressure of $1.0 \times 10^{-2}$ Torr. An ultraviolet curing resin SD-17 (available from Dainippon Ink and Chemicals Inc.) was spin-coated on the reflective layer, to which an ultraviolet ray was irradiated to form a protective layer having a film thickness of 6 λm. An optical recording medium was thus produced.

To the medium obtained, a laser beam was irradiated at a linear speed of 2.4 m/sec. with an optimum laser power to record EFM signals by using an optical disc writer CDU-921S (available from Sony Co.) mounted with a laser head for a semiconductor laser of 780 nm. After recording, the recorded signals were reproduced by using a commercially available CD player (CDX-1050 available from YAMAHA, laser wavelength of 786 nm). A reflectance, an error rate and a degree of modulation were thus measured. All the results satisfied the Orange Book standards. Next, laser beams were irradiated on the optical recording medium on which the signals were recorded to reproduce the recorded signals by using an optical disc evaluation device DDU-1000 (available from Pulstec Industrial Co., Ltd.) mounted with a laser head for red semiconductor lasers of 680 nm, 650 nm, and 635 nm. A reflectance, a jitter value, an error rate and a degree of modulation were measured. The results were all good.

As apparent from the above, this medium can be recorded and reproduced at a plurality of laser wavelengths.

The error rate and the jitter value were measured by using a CD decoder DR3552 (available from KENWOOD) and a TIA-175 time interval analyzer (available from ADC Co.). The degree of modulation was obtained according to the following equation:

Degree of modulation={(maximum intensity of the signals)−(minimum intensity of the signals)}/(maximum intensity of the signals)

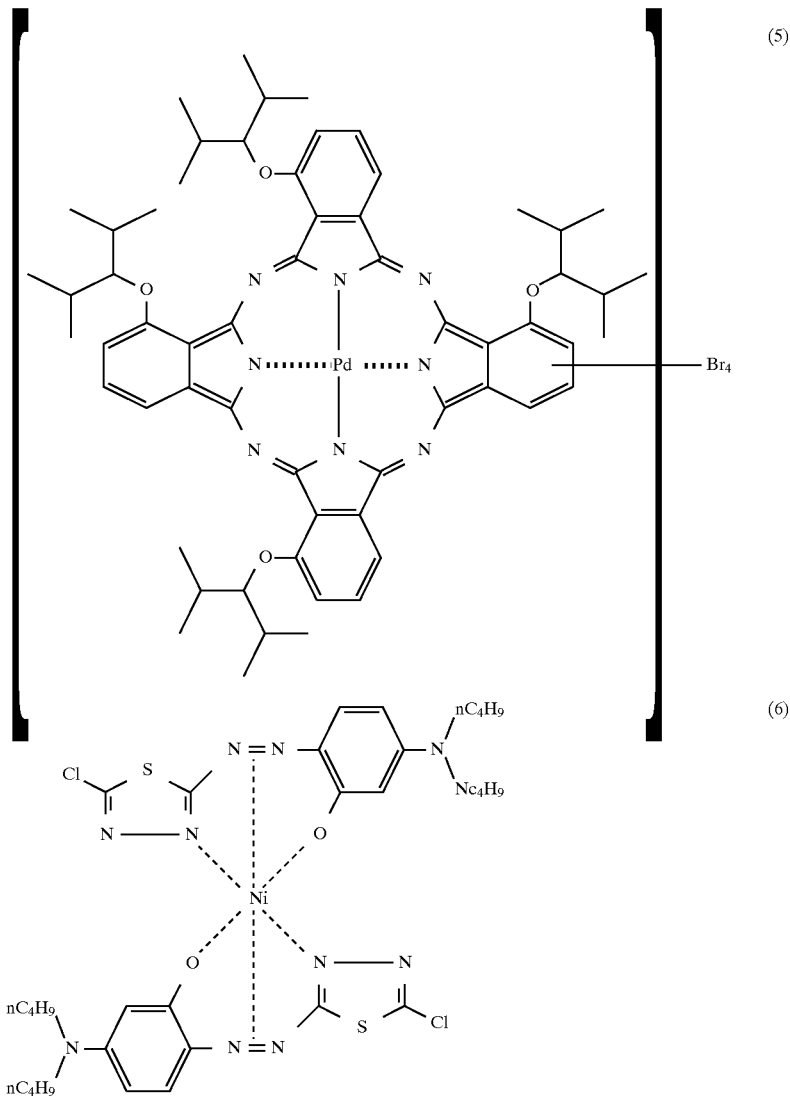

Example 2

Example 1 was repeated to obtain an optical recording medium except that the compound (3) in Table 1 was used as a light absorbent.

For the optical constants of the light interference layer, the refractive index n and the attenuation coefficient k were 2.0 and 0.06, respectively, at a wavelength of 780 nm. The refractive index n and the attenuation coefficient k were 2.1 and 0.09, respectively, at a wavelength of 680 nm. The refractive index n and the attenuation coefficient k were 2.2 and 0.11, respectively, at a wavelength of 650 nm. The refractive index n and the attenuation coefficient k were 2.3 and 0.12, respectively, at a wavelength of 635 nm. The compound (3) has the attenuation coefficient k of 0.13 at a wavelength of 780 nm.

Signals were recorded as in Example 1 on the resultant medium by using a writer (available from Sony Co.) mounted with a laser head for a semiconductor laser of 780 nm. After recording, measurement was made as in Example 1. Good recording properties were obtained.

Example 3

Example 1 was repeated to obtain an optical recording medium except that the compound (10) in Table 1 was used as a light absorbent.

For the optical constants of the light interference layer, the refractive index n and the attenuation coefficient k were 2.0 and 0.06, respectively, at a wavelength of 780 nm. The refractive index n and the attenuation coefficient k were 2.1 and 0.09, respectively, at a wavelength of 680 nm. The refractive index n and the attenuation coefficient k were 2.2 and 0.12, respectively, at a wavelength of 650 nm. The refractive index n and the attenuation coefficient k were 2.3 and 0.11, respectively, at a wavelength of 635 nm. The compound (10) has the attenuation coefficient k of 0.11 at a wavelength of 780 nm.

Signals were recorded as in Example 1 on the resultant medium by using a writer (available from Sony Co.) mounted with a laser head for a semiconductor laser of 780 nm. After recording, measurement was made as in Example 1. Good recording properties were obtained.

Example 4

Example 1 was repeated to obtain an optical recording medium except that the phthalocyanine compound represented by the formula (7) was used for the recording layer.

For the optical constants of the light interference layer, the refractive index n and the attenuation coefficient k were 2.2 and 0.11, respectively, at a wavelength of 780 nm. The refractive index n and the attenuation coefficient k were 1.5 and 0.54, respectively, at a wavelength of 680 nm. The refractive index n and the attenuation coefficient k were 1.5 and 0.49, respectively, at a wavelength of 650 nm. The refractive index n and the attenuation coefficient k were 1.5 and 0.33, respectively, at a wavelength of 635 nm.

Signals were recorded as in Example 1 on the resultant medium by using a writer (available from Sony Co.) mounted with a laser head for a semiconductor laser of 780 nm. After recording, measurement was made as in Example 1. Good recording properties were obtained.

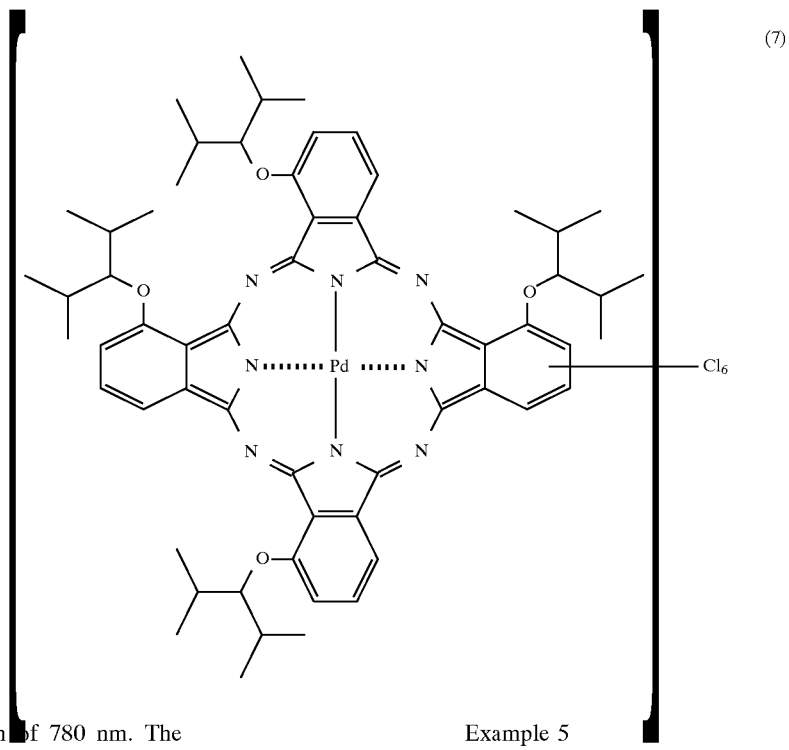

(7)

Example 5

Example 1 was repeated to obtain an optical recording medium except that the compound represented by the formula (8) was used for the light interference layer.

For the optical constants of the light interference layer, the refractive index n and the attenuation coefficient k were 2.0 and 0.06, respectively, at a wavelength of 780 nm. The refractive index n and the attenuation coefficient k were 2.1 and 0.09, respectively, at a wavelength of 680 nm. The refractive index n and the attenuation coefficient k were 2.2 and 0.11, respectively, at a wavelength of 650 nm. The refractive index n and the attenuation coefficient k were 2.2 and 0.10, respectively, at a wavelength of 635 nm.

Signals were recorded as in Example 1 on the resultant medium by using a writer (available from Sony Co.) mounted with a laser head for a semiconductor laser of 780 nm. After recording, measurement was made as in Example 1. Good recording properties were obtained.

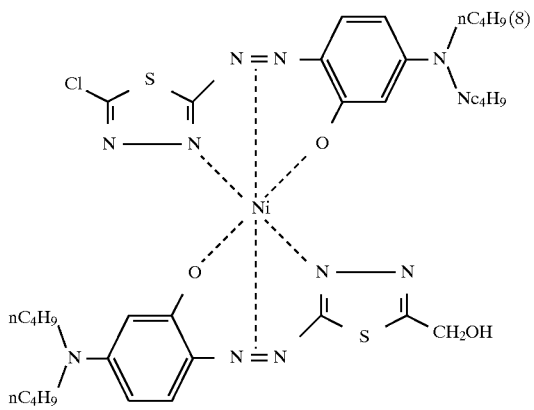

Comparative Example 1

Example 1 was repeated to obtain an optical recording medium except that no light absorbent was added to the light interference layer.

For the optical constants of the light interference layer, the refractive index n and the attenuation coefficient k were 2.0 and 0.06, respectively, at a wavelength of 780 nm. The refractive index n and the attenuation coefficient k were 2.2 and 0.05, respectively, at a wavelength of 680 nm. The refractive index n and the attenuation coefficient k were 2.3 and 0.06, respectively, at a wavelength of 650 nm. The refractive index n and the attenuation coefficient k were 2.4 and 0.10, respectively, at a wavelength of 635 nm.

Signals were recorded as in Example 1 on the resultant medium by using a writer (available from Sony Co.) mounted with a laser head for a semiconductor laser of 780 nm. After recording, measurement was made as in Example 1. The jitter values were bad at 650 nm and 635 nm.

Comparative Example 2

Example 2 was repeated to obtain an optical recording medium except that the light absorbent was added to the light interference layer to provide a weight ratio of 1:1.

For the optical constants of the light interference layer, the refractive index n and the attenuation coefficient k were 2.1 and 0.08, respectively, at a wavelength of 780 nm. The refractive index n and the attenuation coefficient k were 1.8 and 0.28, respectively, at a wavelength of 680 nm. The refractive index n and the attenuation coefficient k were 1.9 and 0.37, respectively, at a wavelength of 650 nm. The refractive index n and the attenuation coefficient k were 1.9 and 0.23, respectively, at a wavelength of 635 nm.

Signals were recorded as in Example 1 on the resultant medium by using a writer (available from Sony Co.) mounted with a laser head for a semiconductor laser of 780 nm. After recording, measurement was made as in Example 1. The jitter values were bad at 650 nm and 635 nm.

Table 2 shows the reflectances, the error rates and the degrees of modulation obtained by reproducing at 786 nm, 680 nm, 650 nm and 635 nm the signals that were recorded at 780 nm on the media, as well as the jitter values (3T pit/land) obtained by reproducing the signals at 650 nm and 635 nm.

TABLE 2

|  | Examples | | | | | Comparative Examples | |
| --- | --- | --- | --- | --- | --- | --- | --- |
|  | 1 | 2 | 3 | 4 | 5 | 1 | 2 |
| Recorded at 780 nm Reproduced at 786 nm | | | | | | | |
| Reflectance (%) | 74 | 75 | 75 | 73 | 73 | 78 | 64 |
| Error Rate (cps) | 5 | 6 | 5 | 7 | 8 | 8 | 11 |
| Degree of Modulation | 0.77 | 0.77 | 0.77 | 0.78 | 0.77 | 0.75 | 0.80 |
| Reproduced at 680 nm | | | | | | | |
| Reflectance (%) | 25 | 25 | 27 | 24 | 24 | 31 | 18 |
| Error Rate (cps) | 11 | 12 | 11 | 12 | 14 | 18 | 60 |
| Degree of Modulation | 0.61 | 0.60 | 0.60 | 0.61 | 0.61 | 0.58 | 0.66 |
| Reproduced at 650 nm | | | | | | | |
| Reflectance (%) | 25 | 23 | 23 | 23 | 23 | 27 | 8 |
| Jitter value (3T PIT/LAND) | 29/29 | 28/29 | 30/31 | 28/31 | 29/31 | 34/41 | 35/67 |
| Error Rate (cps) | 9 | 11 | 10 | 9 | 9 | 25 | 80 |
| Degree of Modulation | 0.71 | 0.71 | 0.70 | 0.71 | 0.70 | 0.66 | 0.73 |
| Reproduced at 635 nm | | | | | | | |
| Reflectance (%) | 34 | 33 | 33 | 33 | 32 | 36 | 10 |
| Jitter value (3T PIT/LAND) | 21/21 | 21/19 | 21/22 | 22/21 | 21/23 | 35/36 | 38/52 |
| Error Rate (cps) | 7 | 8 | 8 | 7 | 7 | 8 | 67 |
| Degree of Modulation | 0.80 | 0.79 | 0.79 | 0.81 | 0.79 | 0.75 | 0.79 |

Example 6

Example 1 was repeated to obtain an optical recording medium except that a porphine compound represented by the formula (9) was used for the light interference layer.

For the optical constants of the light interference layer, the refractive index n and the attenuation coefficient k were 1.8 and 0.07, respectively, at a wavelength of 780 nm. The refractive index n and the attenuation coefficient k were 2.2 and 0.10, respectively, at a wavelength of 532 nm.

To the medium obtained, a laser beam was irradiated at a linear speed of 2.4 m/sec. with an optimum laser power to record EFM signals by using a writer (available from Sony Co.) mounted with a laser head for a semiconductor laser of 780 nm as in Example 1. After recording, the recorded signals were reproduced by using a commercially available CD player. The reflectance, the error rate and the degree of modulation were 73%, 6 cps, and 0.75, respectively, which all satisfied the Orange Book standards.

Next, laser beams were irradiated to the optical recording medium on which the signals were recorded to reproduce the recorded signals by using an optical disc evaluation device mounted with a laser head for a YAG higher harmonic wave conversion laser of 532 nm. The reflectance was 31%, the 3T pit jitter value was 21, the 3T land jitter value was 24, the error rate was 8 cps and the degree of modulation was 0.76, which were all good.

(9)

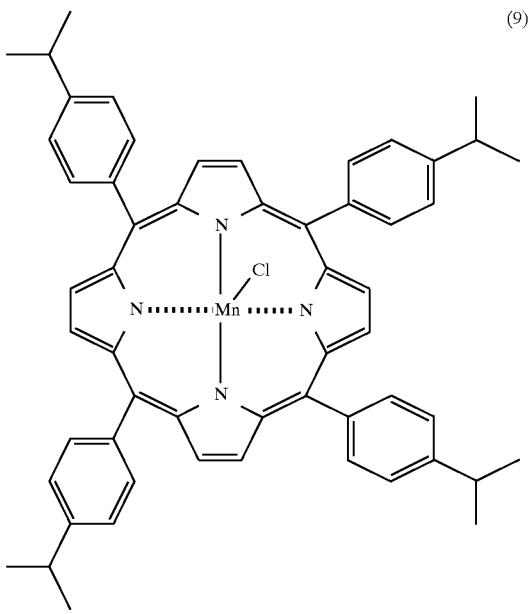

A medium was produced in a similar manner without addition of a light absorbent to the light interference layer. The medium was then evaluated. As a result, the jitter value was 35 or larger and the error rate was 30 cps or higher at 532 nm.

Example 7

Example 1 was repeated to obtain an optical recording medium except that a polyene compound represented by the formula (10) was used for the light interference layer and the compound (6) in Table 1 was used as a light absorbent.

For the optical constants of the light interference layer, the refractive index n and the attenuation coefficient k were 1.8 and 0.06, respectively, at a wavelength of 780 nm. The refractive index n and the attenuation coefficient k were 2.3 and 0.11, respectively, at a wavelength of 430 nm.

To the medium obtained, a laser beam was irradiated at a linear speed of 2.4 m/sec. with an optimum laser power to record EFM signals by using a writer (available from Sony Co.) mounted with a laser head for a semiconductor laser of 780 nm as in Example 1. After recording, the recorded signals were reproduced by using a commercially available CD player. The reflectance, the error rate, and the degree of modulation were 72%, 7 cps and 0.74, respectively, which all satisfied the Orange Book standards.

Next, laser beams were irradiated to the optical recording medium on which the signals were recorded to reproduce the recorded signals by using an optical disc evaluation device mounted with a laser head for a higher harmonic wave conversion laser of 430 nm. The reflectance was 30%, the 3T pit jitter value was 22, the 3T land jitter value was 25, the error rate was 8 cps and the degree of modulation was 0.75, which were all good.

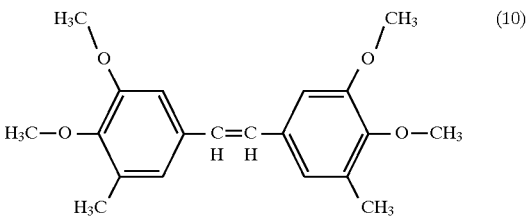

(10)

A medium was produced in a similar manner without addition of a light absorbent to the light interference layer. The medium was then evaluated. As a result, the jitter value was 35 or larger and the error rate was 30 cps or higher at 430 nm.

Example 8

Dye solution 1 is prepared in which 0.02 g of tetraazaporphin compound represented by the formula (11) is dissolved in 10 ml of ethyl cyclohexane. A substrate used was a polycarbonate resin substrate of a disc shape having a thickness of 0.6 mm and a diameter of 120 mm$\phi$ and having a spiral pre-groove formed in the surface thereof (track pitch: 0.80 $\mu$m). The dye solution was coated on the surface of the substrate by spin coating at a rotation speed of 1,600 rpm to form a layer. The layer was dried at 70° C. for 2 hours to provide a recording layer having a film thickness of 85 nm. For the optical constants of this recording layer, the refractive index n was 2.2 and the attenuation coefficient k was 0.08 at a wavelength of 635 nm. The refractive index n and the attenuation coefficient k were 1.2 and 0.55, respectively, at a wavelength of 532 nm.

Furthermore, 0.2 g of quinophthalon represented by the formula (12) was mixed with the azo compound represented by the formula (6) as a light absorbent such that a weight ratio thereof was 5:1. The mixture was then dissolved in 10 ml of 2,2,3,3-tetrafluoro-1-propanol to prepare dye solution 2. The dye solution 2 was spin-coated on the recording layer at a rotation speed of 1,500 rpm to form a layer. This layer was dried at 70° C. for 2 hours to form a light interference layer having a film thickness of 80 nm. For the optical constants of this light interference layer, the refractive index n and the attenuation coefficient k were 2.0 and 0.06, respectively, at a wavelength of 635 nm. The refractive index n and the attenuation coefficient k were 2.3 and 0.10, respectively, at a wavelength of 532 nm. The attenuation coefficient k of the azo compound (6) was 0.10 at a wavelength of 635 nm.

Then, an Ag film was formed by sputtering on the light interference layer by using a sputtering device CDI-900 (available from Balzers, Co.) to form a reflective layer having a film thickness of 100 nm. Argon gas was used as sputtering gas. Sputtering conditions were: sputtering power of 2.5 kW and sputtering gas pressure of 1.0×10-2 Torr. An ultraviolet curing resin SD-301 (available from Dainippon Ink and Chemicals Inc.) was spin-coated on the reflective layer, on which a polycarbonate resin substrate having a diameter of 120 mm$\phi$ and a thickness of 0.6 mm was placed. An ultraviolet ray was then irradiated to form a laminated optical recording medium.

To the medium obtained, a laser beam was irradiated at a linear speed of 5.6 m/sec. with a laser power of 10 mW to record signals by using an optical disc evaluation device DDU-1000 (available from Pulstec Industrial Co., Ltd.) mounted with a laser head for a semiconductor laser of 635 nm. After recording, the recorded signals were reproduced by using the same device. The reflectance was 52%, the error rate was 7 cps and the degree of modulation was 0.74, which could be considered as good signal properties.

Next, laser beams were irradiated to the optical recording medium on which the signals were recorded to reproduce the recorded signals by using an optical disc evaluation device mounted with a laser head for a YAG higher harmonic wave conversion laser of 532 nm. The reflectance was 29%, the 3T pit jitter value was 23, the 3T land jitter value was 24, the error rate was 8 cps and the degree of modulation was 0.74, which were all good.

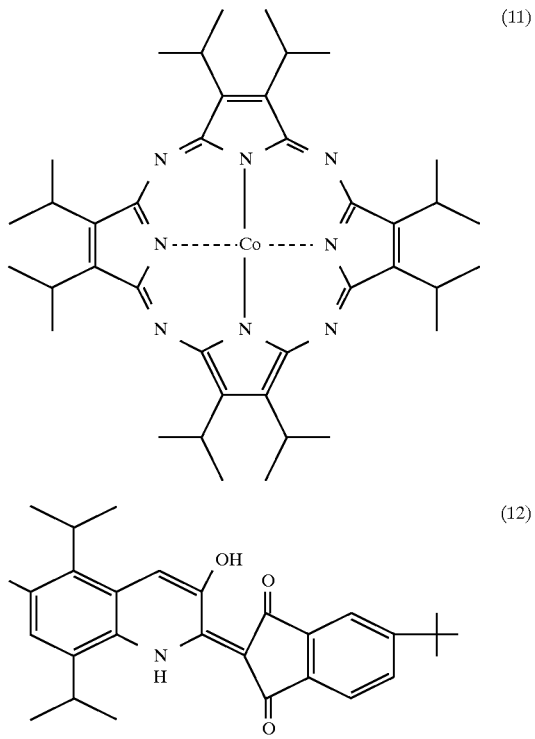

A medium was produced in a similar manner without addition of a light absorbent to the light interference layer. The medium was then evaluated. As a result, the jitter value was 35 or larger and the error rate was 30 cps or higher at 532 nm.

Example 9

Example 8 was repeated to obtain an optical recording medium except that the compound represented by the formula (10) was used for the light interference layer.

For the optical constants of this light interference layer, the refractive index n and the attenuation coefficient k were 1.9 and 0.07, respectively, at a wavelength of 635 nm. The refractive index n and the attenuation coefficient k were 2.3 and 0.11, respectively, at a wavelength of 430 nm.

To the medium obtained, a laser beam was irradiated at a linear speed of 5.6 m/sec. with a laser power of 10 mW to record signals by using an optical disc evaluation device DDU-1000 (available from Pulstec Industrial Co., Ltd.) mounted with a laser head for a semiconductor laser of 635 nm. After recording, the recorded signals were reproduced by using the same device. The reflectance was 50%, the error rate was 8 cps and the degree of modulation was 0.73, which could be considered as good signal properties.

Next, laser beams were irradiated to the optical recording medium on which the signals were recorded to reproduce the recorded signals by using an optical disc evaluation device mounted with a laser head for a higher harmonic wave conversion laser of 430 nm. The reflectance was 32%, the 3T pit jitter value was 22, the 3T land jitter value was 23, the error rate was 8 cps and the degree of modulation was 0.75, which were all good.

A medium was produced in a similar manner without addition of a light absorbent to the light interference layer. The medium was then evaluated. As a result, the jitter value was 35 or larger and the error rate was 30 cps or higher at 430 nm.

Example 10

Dye solution 1 is prepared in which 0.02 g of dipyrromethene compound represented by the formula (13) is dissolved in 10 ml of ethyl cyclohexane. A substrate used was a polycarbonate resin substrate of a disc shape having a thickness of 0.6 mm and a diameter of 120 mm$\phi$ and having a spiral pre-groove formed in the surface thereof (track pitch: 0.80 $\mu$m). The dye solution was coated on the surface of the substrate by spin-coating at a rotation speed of 1,800 rpm to form a layer. The layer was dried at 70° C. for 2 hours to provide a recording layer having a film thickness of 80 nm. For the optical constants of this recording layer, the refractive index n was 2.4 and the attenuation coefficient k was 0.13 at a wavelength of 532 nm. The refractive index n and the attenuation coefficient k were 1.2 and 0.65, respectively, at a wavelength of 430 nm.

Furthermore, 0.2 g of the compound represented by the formula (10) was mixed with the compound represented by the formula (9) as a light absorbent such that a weight ratio thereof was 5:1. The mixture was then dissolved in 10 ml of 2,2,3,3-tetrafluoro-1-propanol to prepare dye solution 2. The dye solution 2 was spin-coated on the recording layer at a rotation speed of 1,600 rpm to form a layer. This layer was dried at 70° C. for 2 hours to form a light interference layer having a film thickness of 80 nm. For the optical constants of this light interference layer, the refractive index n and the attenuation coefficient k were 2.0 and 0.09, respectively, at a wavelength of 532 nm. The refractive index n and the attenuation coefficient k were 2.2 and 0.11, respectively, at a wavelength of 532 nm. The attenuation coefficient k of the azo compound (9) was 0.10 at a wavelength of 532 nm.

Then, a laminated optical recording medium was produced in the same manner as in Example 8.

To the medium obtained, a laser beam was irradiated at a linear speed of 5.6 m/sec. with a laser power of 9 mW to record signals by using an optical disc evaluation device DDU-1000 (available from Pulstec Industrial Co., Ltd.) mounted with a laser head for a higher harmonic wave conversion laser of 532 nm. After recording, the recorded signals were reproduced by using the same device. The reflectance was 48%, the error rate was 8 cps and the degree of modulation was 0.73, which could be considered as good signal properties.

Next, laser beams were irradiated to the optical recording medium on which the signals were recorded to reproduce the recorded signals by using an optical disc evaluation device with a laser head for a higher harmonic wave conversion laser of 430 nm. The reflectance was 28%, the 3T pit jitter value was 23, the 3T land jitter value was 25, the error rate was 9 cps and the degree of modulation was 0.76, which were all good.

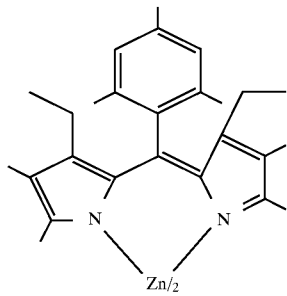
(13)

A medium was produced in a similar manner without addition of a light absorbent to the light interference layer. The medium was then evaluated. As a result, the jitter value was 35 or larger and the error rate was 30 cps or higher at 430 nm.

Example 11

A recording layer was formed in the same manner as in Example 1. Then, 0.2 g of the azo compound represented by the formula (14) and the thermal decomposition promoter represented by the formula (15) were mixed such that a molar ratio is 1:1. The mixture was then dissolved in 10 ml of 2,2,3,3-tetrafluoro-1-propanol to prepare a dye solution. The solution was spin-coated on the recording layer at a rotation speed of 1,500 rpm to form a layer. This layer was dried at 70° C. for 2 hours to form a light interference layer having a film thickness of 80 nm. For the optical constants of this light interference layer, the refractive index n and the attenuation coefficient k were 1.9 and 0.05, respectively, at a wavelength of 780 nm. The refractive index n and the attenuation coefficient k were 2.1 and 0.04, respectively, at a wavelength of 680 nm. The refractive index n and the attenuation coefficient k were 2.2 and 0.05, respectively, at a wavelength of 650 nm. The refractive index n and the attenuation coefficient k were 2.4 and 0.08, respectively, at a wavelength of 635 nm. Then, an optical recording medium was produced in the same manner as in Example 1.

To the medium obtained, a laser beam was irradiated at a linear speed of 2.4 m/sec. with a laser power of 11 mW to record EFM signals by using a writer CDD-521 (available from Philips Co.) mounted with a laser head for a semiconductor laser of 780 nm. After recording, the recorded signals were reproduced by using a commercially available CD player (YAMAHA CDX-1050; laser wavelength of 786 nm). A deviation (11T pit), a reflectance, an error rate and a degree of modulation were measured. All the results were good to satisfy the Orange Book standards.

Next, laser beams were irradiated to the optical recording medium on which the signals were recorded to reproduce the recorded signals by using an optical disc evaluation device DDU-1000 (available from Pulstec Industrial Co., Ltd.) mounted with a laser head for red semiconductor lasers of 680 nm, 650 nm and 635 nm. The reflectance, the error rate, and the degree of modulation were measured. The results all have good values.

Next, to the medium obtained, a laser beam was irradiated at a linear speed of 2.4 m/sec. with a laser power of 10 mW to record signals by using an optical disc evaluation device DDU-1000 (available from Pulstec Industrial Co., Ltd.) mounted with a laser head for a red semiconductor laser of 680 nm and an EFM encoder (available from KENWOOD). After recording, the recorded signals were reproduced by using an evaluation device with a laser head for red semiconductor lasers of 680 nm and 635 nm. A reflectance, an error rate and a degree of modulation were measured. The results all provided good values. The signals recorded by using the drive DDU-1000 at 680 nm were reproduced by using a commercially available CD player (YAMAHA CDX-1050; laser wavelength of 786 nm). The deviation (11T pit), the reflectance, error rate and degree of modulation were measured. All the results were good to satisfy the Orange Book Standards.

The recording medium was recorded and reproduced with a plurality of the laser wavelengths.

The deviation was measured by using the TIA-175 time interval analyzer (available from ADC Co.).

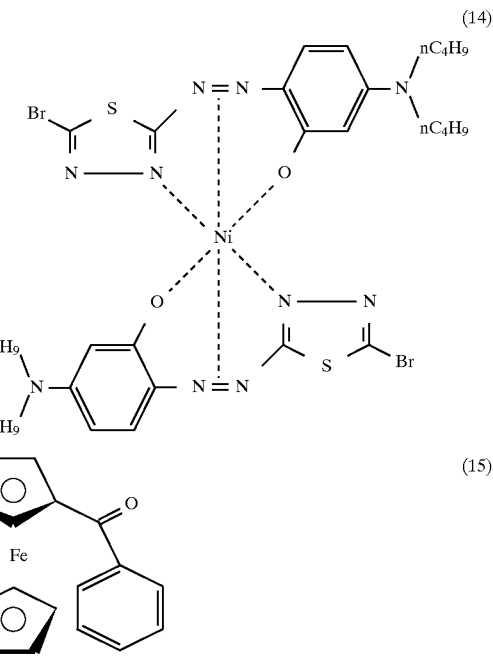

Example 12

Example 11 was repeated to obtain an optical recording medium except that the compound represented by the formula (16) was used as a thermal decomposition promoter. For the optical constants of this light interference layer, the refractive index n and the attenuation coefficient k were 1.8 and 0.06, respectively, at a wavelength of 780 nm. The refractive index n and the attenuation coefficient k were 2.0 and 0.04, respectively, at a wavelength of 680 nm. The refractive index n and the attenuation coefficient k were 2.1 and 0.06, respectively, at a wavelength of 650 nm. The refractive index n and the attenuation coefficient k were 2.2 and 0.08, respectively, at a wavelength of 635 nm.

To the medium obtained, a laser beam was irradiated as in Example 11 to record signals by using a writer (available from Philips Co.) mounted with a laser head for a semiconductor laser of 780 nm, an optical disc evaluation device DDU-1000 (available from Pulstec Industrial Co., Ltd.,) mounted with a laser head for a red semiconductor laser of 680 nm and an EFM encoder available (from KENWOOD). After recording, the measurement was made as in Example 11. As a result, all exhibited good recording properties.

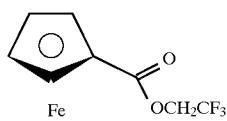

(16)

Example 13

Example 11 was repeated to obtain an optical recording medium except that the compound represented by the formula (17) was used as a thermal decomposition promoter. For the optical constants of this light interference layer, the refractive index n and the attenuation coefficient k were 1.8 and 0.06, respectively, at a wavelength of 780 nm. The refractive index n and the attenuation coefficient k were 1.9 and 0.05, respectively, at a wavelength of 680 nm. The refractive index n and the attenuation coefficient k were 2.0 and 0.06, respectively, at a wavelength of 650 nm. The refractive index n and the attenuation coefficient k were 2.2 and 0.07, respectively, at a wavelength of 635 nm.

To the medium obtained, a laser beam was irradiated as in Example 11 to record signals by using a writer (available from Philips Co.) mounted with a laser head for a semiconductor laser of 780 nm, an optical disc evaluation device DDU-1000 (available from Pulstec Industrial Co., Ltd.) mounted with a laser head for a red semiconductor laser of 680 nm and an EFM encoder available (from KENWOOD). After recording, the measurement was made as in Example 11. As a result, all exhibited good recording properties.

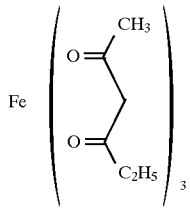

(17)

Comparative Example 3

Example 11 was repeated to obtain an optical recording medium except that no thermal decomposition promoter was added to the light interference layer. To the medium obtained, a laser beam was irradiated as in Example 11 to record signals by using a writer (available from Philips Co.) mounted with a laser head for a semiconductor laser of 780 nm, an optical disc evaluation device DDU-1000 (available from Pulstec Industrial Co., Ltd.) mounted with a laser head for a red semiconductor laser of 680 nm and an EFM encoder (available from KENWOOD). After recording, the measurement was made as in Example 11. As a result, the deviation was bad at 780 nm.

Table 3 shows the deviation (11T pit), the reflectance, the error rate and the degree of modulation obtained by reproducing at 786 nm, 680 nm, 650 nm and 635 nm signals which were recorded at 780 nm and 680 nm on the media of Examples 11 to 13 and Comparative Example 3.

TABLE 3

|  | Examples | | | Comparative Example |
|---|---|---|---|---|
|  | 11 | 12 | 13 | 3 |
| Recording at 780 nm Reproduced at 786 nm | | | | |
| Deviation (11T PIT) | −42 | −45 | −53 | −60 |
| Reflectance (%) | 77 | 78 | 77 | 76 |
| Error Rate (cps) | 6 | 7 | 12 | 24 |
| Degree of Modulation | 0.77 | 0.78 | 0.76 | 0.75 |
| Reproduced at 680 nm | | | | |
| Reflectance (%) | 31 | 29 | 28 | 25 |
| Error Rate (cps) | 9 | 10 | 16 | 25 |
| Degree of Modulation | 0.61 | 0.60 | 0.60 | 0.58 |
| Reproduced at 650 nm | | | | |
| Reflectance (%) | 27 | 26 | 24 | 24 |
| Error Rate (cps) | 10 | 12 | 17 | 27 |
| Degree of Modulation | 0.58 | 0.56 | 0.57 | 0.52 |
| Reproduced at 635 nm | | | | |
| Reflectance (%) | 40 | 35 | 33 | 31 |
| Error Rate (cps) | 8 | 9 | 10 | 25 |
| Degree of Modulation | 0.83 | 0.78 | 0.79 | 0.71 |
| Recording at 680 nm Reproduced at 786 nm | | | | |
| Deviation (11T PIT) | −41 | −44 | −53 | −60 |
| Reflectance (%) | 76 | 75 | 75 | 74 |
| Error Rate (cps) | 6 | 7 | 12 | 26 |
| Degree of Modulation | 0.77 | 0.78 | 0.77 | 0.75 |
| Reproduced at 680 nm | | | | |
| Reflectance (%) | 31 | 29 | 28 | 25 |
| Error Rate (cps) | 9 | 10 | 14 | 24 |
| Degree of Modulation | 0.61 | 0.60 | 0.61 | 0.58 |
| Reproduced at 650 nm | | | | |
| Reflectance (%) | 27 | 26 | 25 | 24 |
| Error Rate (cps) | 10 | 12 | 16 | 23 |
| Degree of Modulation | 0.59 | 0.57 | 0.57 | 0.53 |
| Reproduced at 635 nm | | | | |
| Reflectance (%) | 38 | 34 | 33 | 31 |
| Error Rate (cps) | 8 | 9 | 14 | 26 |
| Degree of Modulation | 0.81 | 0.78 | 0.78 | 0.70 |

Example 14

Example 11 was repeated to obtain an optical recording medium except that the porphine compound represented by the formula (9) was used in place of the compound represented by the formula (14) as a dye for the light interference layer. For the optical constants of this light interference layer, the refractive index n and the attenuation coefficient k were 1.8 and 0.05, respectively, at a wavelength of 780 nm. The refractive index n and the attenuation coefficient k were 2.2 and 0.08, respectively, at a wavelength of 532 nm.

To the medium obtained, a laser beam was irradiated at a linear speed of 2.4 m/sec. with a laser power of 11 mW to record EFM signals by using a writer (available from Philips Co.) mounted with a laser head for a semiconductor laser of 780 nm. After recording, the recorded signals were reproduced by using a commercially available CD player. The deviation (11T pit) was −47, the reflectance was 74%, the error rate was 9 cps and the degree of modulation was 0.76. All the results were good to satisfy the Orange Book Standards.

Next, a laser beam was irradiated to the medium to reproduce the recorded signals by using an optical disc evaluation device mounted with a laser head for a YAG higher harmonic wave conversion laser of 532 nm. As a result, the reflectance was 31%, the error rate was 9 cps and the degree of modulation was 0.78, which all were good values.

A medium was similarly produced and evaluated with no thermal decomposition promoter added to the light interference layer. As a result, the deviation (11T pit) at 780 nm was as bad as −60 or smaller and the reflectance and the degree of modulation were small at 532 nm.

Example 15

Example 11 was repeated to obtain an optical recording medium except that the polyene compound represented by the formula (10) was used in place of the compound represented by the formula (14) as a dye for the light interference layer. For the optical constants of this light interference layer, the refractive index n and the attenuation coefficient k were 1.8 and 0.04, respectively, at a wavelength of 780 nm. The refractive index n and the attenuation coefficient k were 2.3 and 0.09, respectively, at a wavelength of 430 nm.

To the medium obtained, a laser beam was irradiated at a linear speed of 2.4 m/sec. with a laser power of 11 mW to record EFM signals by using a writer (available from Philips Co.) mounted with a laser head for a semiconductor laser of 780 nm. After recording, the recorded signals were reproduced by using a commercially available CD player. The deviation (11T pit) was −50%, the reflectance was 75%, the error rate was 8 cps and the degree of modulation was 0.76. All the results were good to satisfy the Orange Book Standards.

Next, a laser beam was irradiated to the medium to reproduce the recorded signals by using an optical disc evaluation device mounted with a laser head for a higher harmonic wave conversion laser of 430 nm. As a result, the reflectance was 30%, the error rate was 11 cps and the degree of modulation was 0.77, which all were good values.

A medium was similarly produced and evaluated with no thermal decomposition promoter added to the light interference layer. As a result, the deviation (11T pit) at 780 nm was as bad as −60 or smaller, and the reflectance and the degree of modulation were small at 430 nm.

Example 16

Example 8 was repeated to obtain an optical recording medium except that the compound represented by the formula (15) as a thermal decomposition promotor was added to the light interference layer at a molar ratio of 1:1 relative to the dye in the light interference layer in place of the light absorbing dye represented by the formula (6). For the optical constants of this light interference layer, the refractive index n and the attenuation coefficient k were 1.9 and 0.05, respectively, at a wavelength of 635 nm. The refractive index n and the attenuation coefficient k were 2.2 and 0.07, respectively, at a wavelength of 532 nm.

To the medium obtained, a laser beam was irradiated at a linear speed of 5.6 m/sec. with a laser power of 10 mW to record signals by using an optical disc evaluation device DDU-1000 (available from Pulstec Industrial Co., Ltd.) mounted with a laser head for a semiconductor laser of 635 nm. After recording, the recorded signals were reproduced by using the same device. The deviation (11T pit) was −49, the reflectance was 51%, the error rate was 7 cps and the degree of modulation was 0.74, which all were good signal properties.

Next, a laser beam was irradiated to the medium to reproduce the recorded signals by using an optical disc evaluation device mounted with a laser head for a YAG higher harmonic wave conversion laser of 532 nm. As a result, the reflectance was 35%, the error rate was 8 cps and the degree of modulation was 0.76, which all were good values.

A medium was similarly produced and evaluated with no thermal decomposition promoter added to the light interference layer. As a result, the deviation (11T pit) at 635 nm was as bad as −60 or smaller, and the reflectance and the degree of modulation were small at 532 nm.

Example 17

Example 9 was repeated to obtain an optical recording medium except that the compound represented by the formula (16) as a thermal decomposition promoter was added to the light interference layer at a molar ratio of 1:1 relative to the dye in the light interference layer in place of the light absorbing dye represented by the formula (6). For the optical constants of this light interference layer, the refractive index n and the attenuation coefficient k were 1.8 and 0.05, respectively, at a wavelength of 635 nm. The refractive index n and the attenuation coefficient k were 2.2 and 0.08, respectively, at a wavelength of 532 nm.

To the medium obtained, a laser beam was irradiated at a linear speed of 5.6 m/sec. with a laser power of 10 mW to record EFM signals by using an optical disc evaluation device DDU-1000 (available from Pulstec Industrial Co., Ltd.) mounted with a laser head for a semiconductor laser of 635 nm. After recording, the recorded signals were reproduced by using the same device. The deviation (11T pit) was −48, the reflectance was 49%, the error rate was 10 cps and the degree of modulation was 0.74, which all were good signal properties.

Next, a laser beam was irradiated to the medium to reproduce the recorded signals by using an optical disc evaluation device mounted with a laser head for a higher harmonic wave conversion laser of 430 nm. As a result, the reflectance was 32%, the error rate was 9 cps and the degree of modulation was 0.77, which all were good values.

A medium was similarly produced and evaluated with no thermal decomposition promoter added to the light interference layer. As a result, the deviation (11T pit) at 635 nm was as bad as −60 or smaller, and the reflectance and the degree of modulation were small at 430 nm.

Example 18

Example 10 was repeated to obtain an optical recording medium except that the compound represented by the formula (17) as a thermal decomposition promoter was added to the light interference layer at a molar ratio of 1:1 relative to the dye in the light interference layer in place of the light absorbing dye represented by the formula (9). For the optical constants of this light interference layer, the refractive index n and the attenuation coefficient k were 1.9 and 0.06, respectively, at a wavelength of 532 nm. The refractive index n and the attenuation coefficient k were 2.1 and 0.08, respectively, at a wavelength of 430 nm.

To the medium obtained, a laser beam was irradiated at a linear speed of 5.6 m/sec. with a laser power of 9 mW to record EFM signals by using an optical disc evaluation device DDU-1000 available (from Pulstec Industrial Co., Ltd.) mounted with a laser head for a higher harmonic wave conversion laser of 532 nm. After recording, the recorded signals were reproduced by using the same device. The deviation (11T pit) was −49, the reflectance was 50%, the error rate was 10 cps and the degree of modulation was 0.74, which all were good signal properties.

Next, a laser beam was irradiated to the medium to reproduce the recorded signals by using an optical disc evaluation device with a laser head for a higher harmonic wave conversion laser of 430 nm. As a result, the reflectance was 30%, the error rate was 9 cps and the degree of modulation was 0.76, which all were good values.

A medium was similarly produced and evaluated with no thermal decomposition promoter added to the light interference layer. As a result, the deviation (11T pit) at 532 nm was as bad as −60 or smaller, and the reflectance and the degree of modulation were small at 430 nm.

Example 19

Example 1 was repeated to obtain an optical recording medium except that the thermal decomposition promoter represented by the formula (15) was added to the dye solution for spin-coating the light interference layer at a molar ratio of 1:1 relative to the azo dye when forming the light interference layer.

For the optical constants of this light interference layer, the refractive index n and the attenuation coefficient k were 1.9 and 0.07, respectively, at a wavelength of 780 nm. The refractive index n and the attenuation coefficient k were 2.3 and 0.09, respectively, at a wavelength of 635 nm.

To the medium obtained, a laser beam was irradiated at a linear speed of 2.4 m/sec. with an optimum laser power to record EFM signals by using a writer (available from Sony Co.) mounted with a laser head for a semiconductor laser of 780 nm. After recording, the recorded signals were reproduced by using a commercially available CD player. The deviation (11T pit) was 43, the reflectance was 74%, the error rate was 6 cps and the degree of modulation was 0.76, which all were good signal properties.

Next, a laser beam was irradiated to the medium to reproduce the recorded signals by using an optical disc evaluation device mounted with a laser head for a semiconductor laser of 635 nm. As a result, the reflectance was 33%, the 3T pit jitter value was 21, the 3T land jitter value was 22, the error rate was 7 cps, and the degree of modulation was 0.79, which all were good values.

What is claimed is:

1. An optical recording medium comprising recording layer, a light interference layer, a reflective layer and a protective layer that are laminated on a substrated, wherein said recording layer and said ligh intererence layer comprises at least one organic dye, and that a light absorbent in an amount of ⅓ to ⅐ by weight based on the organic dye and/or thermal decomposition promoter are/is added to said light interference layer.

2. An optical recording medium as claimed in claim 1, wherein said light absorbent has an attenuation coefficient k of 0.06 or larger at a recording and reproducing laser wavelength $\lambda 1$, and said thermal decomposition promoter decomposes at a lower temperature than the organic dye contained in said light interference layer to generate heat of decomposition or to generate a radical that is active to a reaction.

3. An optical recording medium as claimed in claim 2, characterized in that the information is recorded and/or reproduced by using a laser beam having a wavelength $\lambda 1$ and is also recorded and/or reproduced by using a wavelength $\lambda 2$ that is shorter by at least 80 nm than the wavelength $\lambda 1$, wherein said recording layer has a refractive index n of 1.8 or higher at $\lambda 1$ and of 1.0 or higher at $\lambda 2$ and an attenuation coefficient k ranging between 0.04 and 0.02 at $\lambda 1$ and between 0.04 and 0.7 at $\lambda 2$, and said light interference layer has a refractive index n of 1.5 or higher at $\lambda 1$ and 1.7 or higher at $\lambda 2$ and an attenuation coefficient k ranging between 0.02 and 0.15 at $\lambda 1$ and between 0.04 and 0.25 at $\lambda 2$.

4. An optical recording medium as claimed in claim 3 wherein said recording layer has the refractive index n ranging between 1.9 and 2.7 at $\lambda 1$ and between 1.0 and 1.6 at $\lambda 2$ and the attenuation coefficient k ranging between 0.04 and 0.16 at $\lambda 1$ and between 0.1 and 0.7 at $\lambda 2$, and said light interference layer has the refractive index n ranging between 1.7 and 2.2 at $\lambda 1$ and between 1.8 and 2.7 at $\lambda 2$ and the attenuation coefficient k ranging between 0.04 and 0.14 at $\lambda 1$ and between 0.04 and 0.18 at $\lambda 2$.

5. An optical recording medium as claimed in claim 4, wherein the wavelength $\lambda 1$ of the laser beam is selected from the range between 770 and 830 nm and the wavelength $\lambda 2$ is selected from the range between 620 and 690 nm, and wherein the reflectance is 65% or higher to the laser beam having the wavelength $\lambda 1$ and is 15% or higher to the laser beam having the wavelength $\lambda 2$, when measured through the substrate.

6. An optical recording medium as claimed in claim 5 wherein the organic dye used for said light interference layer comprises an azo dye or a metal complex of said azo dye, the azo dye being represented by the following general formula (1):

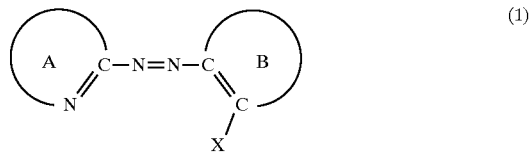

wherein A is a residue forming a heterocyclic ring along with nitrogen and carbon atoms bonded therewith; B is a residue forming an aromatic ring along with two carbon atoms bonded therewith; and X is a group having an active hydrogen.

7. An optical recording medium as claimed in claim 6 wherein the organic dye used for said recording layer comprises a phthalocyanine dye represented by the following general formula (2):

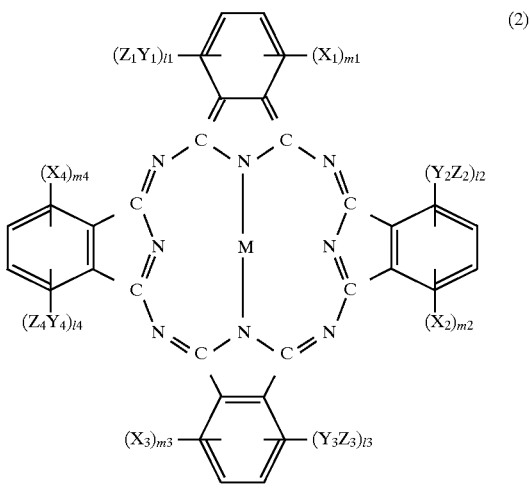

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

8. An optical recording medium as claimed in claim 5 wherein the organic dye used for said recording layer comprises a phthalocyanine dye represented by the following general formula (2):

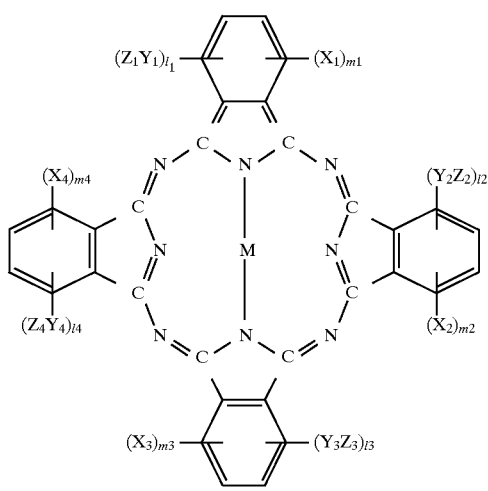

(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

9. An optical recording medium as claimed in claim 5, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

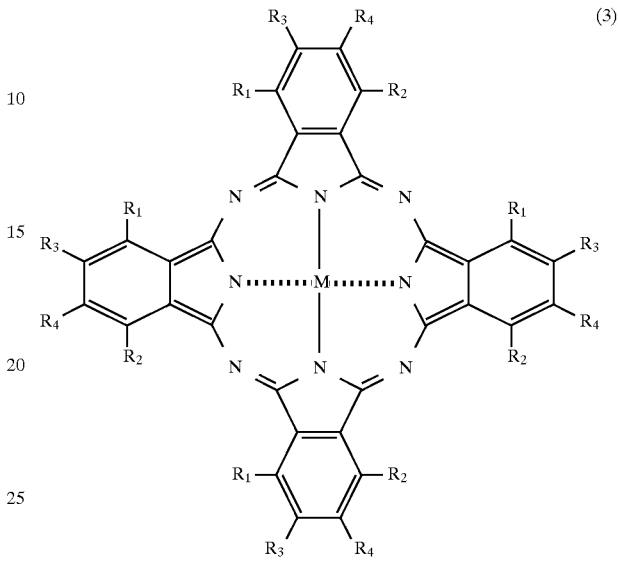

(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

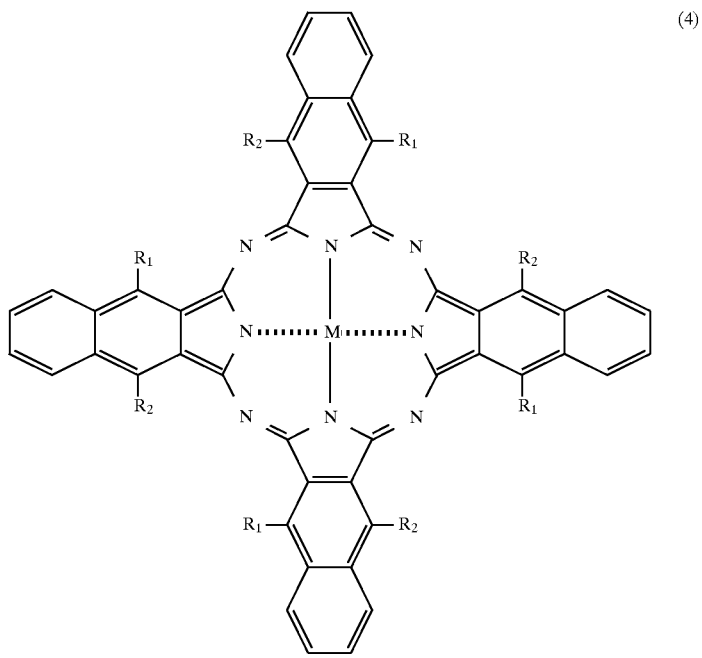

(4)

wherein $R_1$, $R_2$ and M are the same as those in the above formula 3; in which $R_1$ and $R_2$ may be interchanged.

10. An optical recording medium as claimed in claim 4, wherein the wavelength λ1 of the laser beam is selected from the range between 770 and 830 nm and the wavelength λ2 is selected from the range between 480 and 540 nm or between 400 and 440, and wherein the reflectance is 65% or higher to the laser beam having the wavelength λ1 and is 15% or higher to the laser beam having the wavelength λ2, when measured through the substrate.

11. An optical recording medium as claimed in claim 10, wherein the organic dye used for said recording layer comprises a phthalocyanine dye represented by the following general formula (2):

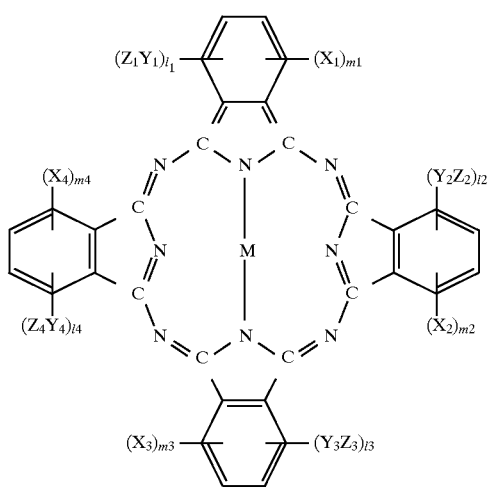

(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

12. An optical recording medium as claimed in claim 10, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

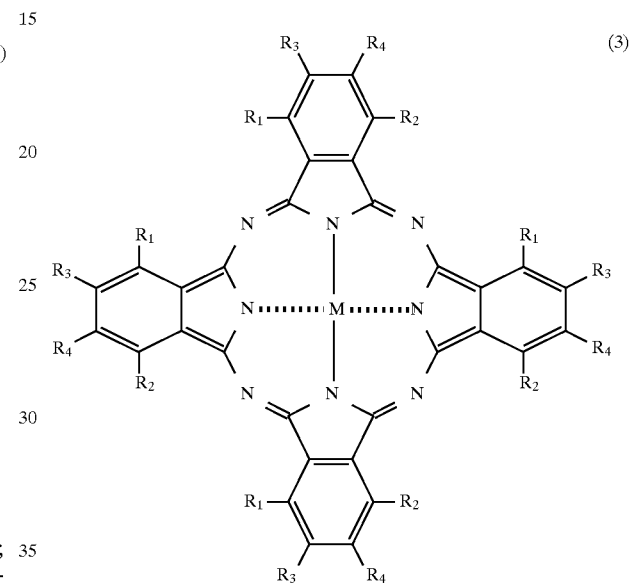

(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

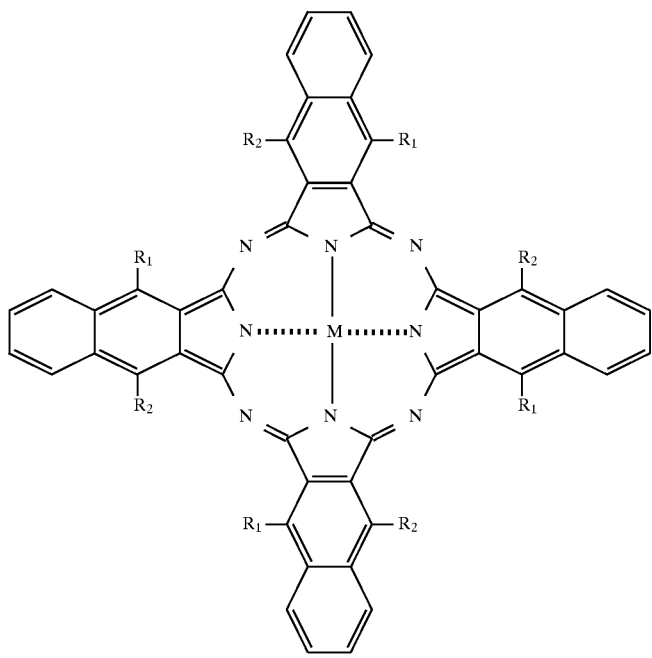

(4)

wherein $R_1$, $R_2$ and M are the same as those in the above formula 3; in which $R_1$ and $R_2$ may be interchanged.

13. An optical recording medium as claimed in claim 4, wherein the wavelength $\lambda 1$ of the laser beam is selected from the range between 620 and 690 nm and the wavelength $\lambda 2$ is selected from the range between 480 and 540 nm or between 400 and 440, and wherein the reflectance is 20% or higher to the laser beam having the wavelength $\lambda 1$ and is 15% or higher to the laser beam having the wavelength $\lambda 2$, when measured through the substrate.

14. An optical recording medium as claimed in claim 4, wherein the wavelength $\lambda 1$ of the laser beam is selected from the range between 480 and 540 nm and the wavelength $\lambda 2$ is selected from the range between 400 and 440, and wherein the reflectance is 20% or higher to the laser beam having the wavelength $\lambda 1$ and is 15% or higher to the laser beam having the wavelength $\lambda 2$, when measured through the substrate.

15. An optical recording medium as claimed in claim 4, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

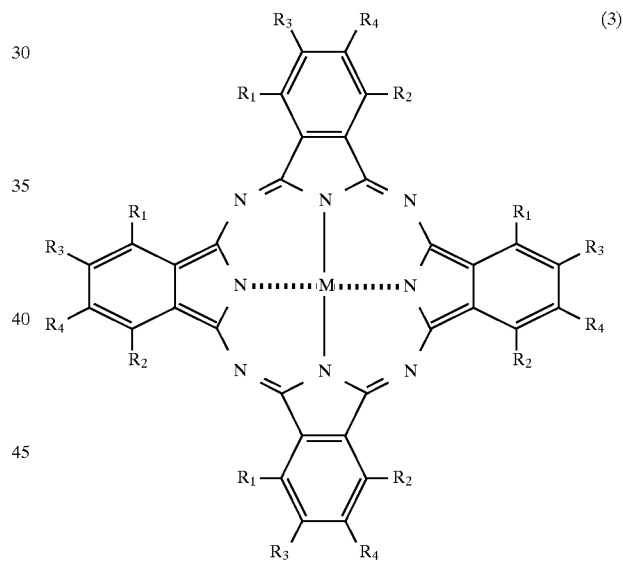

(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

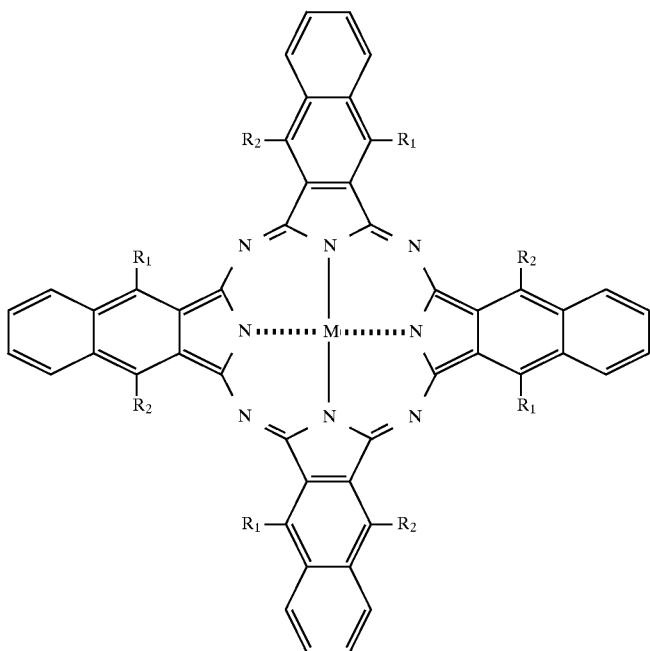

(4)

wherein $R_1$, $R_2$ and M are the same as those in the above formula 3; in which $R_1$ and $R_2$ may be interchanged.

16. An optical recording medium as claimed in claim 3, wherein the information is recorded and reproduced by using a laser beam having the wavelength of $\lambda 1$ and also is reproduced by using a laser beam having a wavelength of $\lambda 2$.

17. An optical recording medium as claimed in claim 16, wherein the wavelength $\lambda 1$ of the laser beam is selected from the range between 770 and 830 nm and the wavelength $\lambda 2$ is selected from the range between 620 and 690 nm, and wherein the reflectance is 65% or higher to the laser beam having the wavelength $\lambda 1$ and is 15% or higher to the laser beam having the wavelength $\lambda 2$, when measured through the substrate.

18. An optical recording medium as claimed in claim 17 wherein the organic dye used for said light interference layer comprises an azo dye or a metal complex of said azo dye, the azo dye being represented by the following general formula (1):

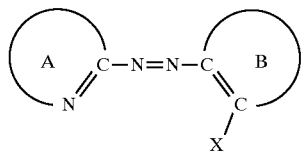

(1)

wherein A is a residue forming a heterocyclic ring along with nitrogen and carbon atoms bonded therewith; B is a residue forming an aromatic ring along with two carbon atoms bonded therewith; and X is a group having an active hydrogen.

19. An optical recording medium as claimed in claim 18, wherein the organic dye used for said recording layer comprises a phthalocyanine dye represented by the following general formula (2):

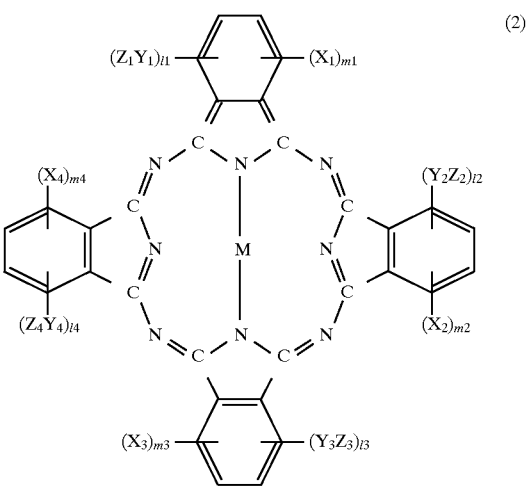

(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

20. An optical recording medium as claimed in claim 17, wherein the organic dye used for said recording layer comprises a phthalocyanine dye represented by the following general formula (2):

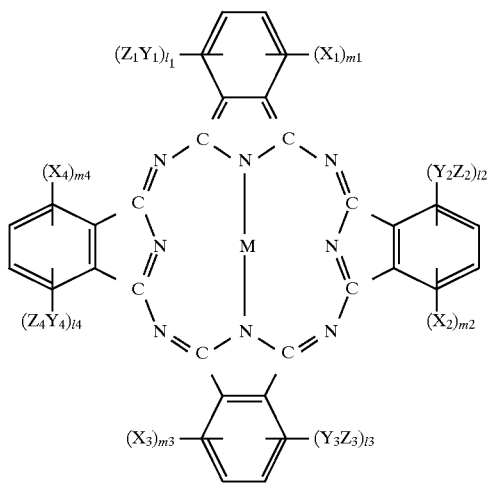

(2)

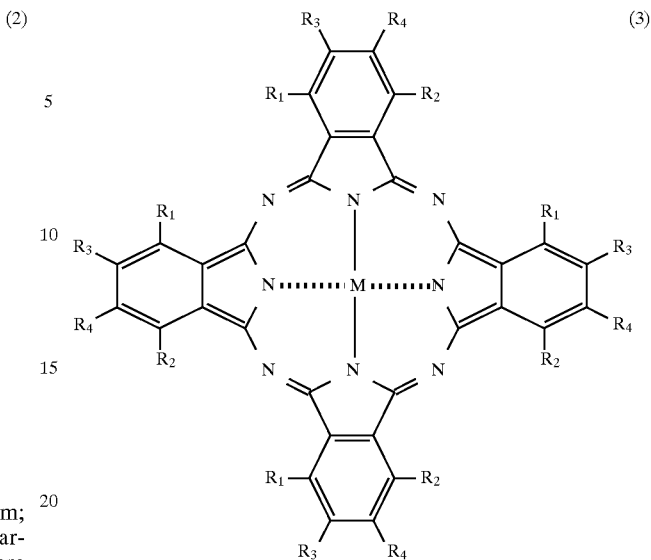

(3)

wherein $Y_1$ to $Y_4$ are each an oxygen atom or a sulfur atom; $Z_1$ to $Z_4$ are each a substituted or non-substituted hydrocarbon group having from 2 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

21. An optical recording medium as claimed in claim 17, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

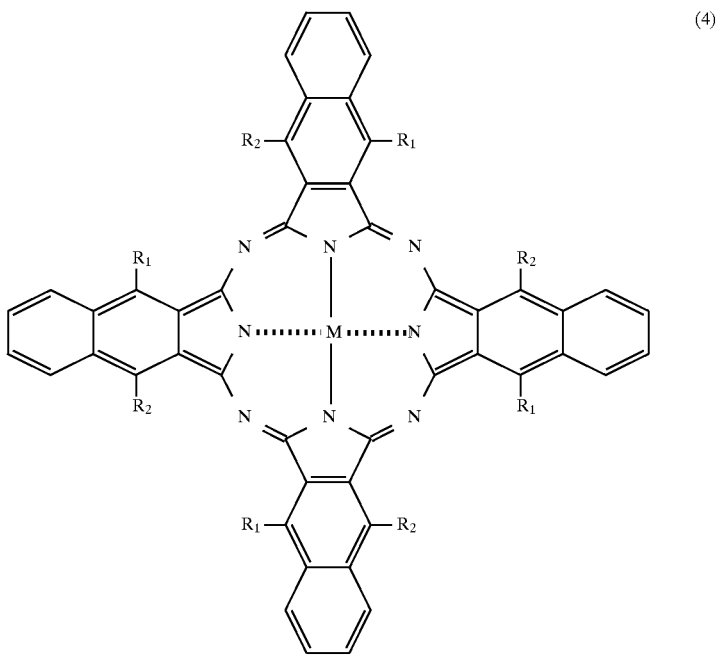

(4)

wherein $R_1$, $R_2$ and M are the same as those in the above formula 3; in which $R_1$ and $R_2$ may be interchanged.

22. An optical recording medium as claimed in claim 16, wherein the wavelength $\lambda 1$ of the laser beam is selected from the range between 770 and 830 nm and the wavelength $\lambda 2$ is selected from the range between 480 and 540 nm or between 400 and 440, and wherein the reflectance is 65% or higher to the laser beam having the wavelength $\lambda 1$ and is 15% or higher to the laser beam having the wavelength λ2, when measured through the substrate.

23. An optical recording medium as claimed in claim 22, wherein the organic dye used for said recording layer comprises a phthalocyanine dye represented by the following general formula (2):

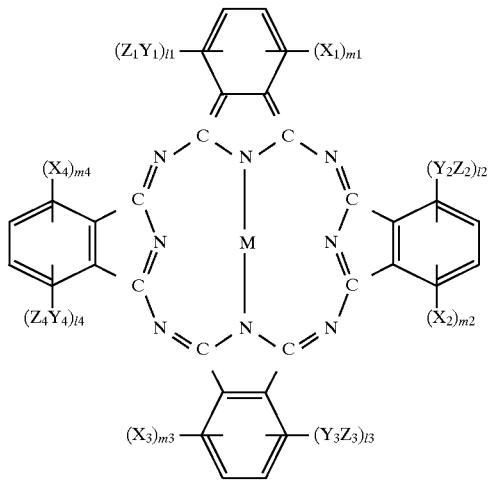

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

24. An optical recording medium as claimed in claim 22, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

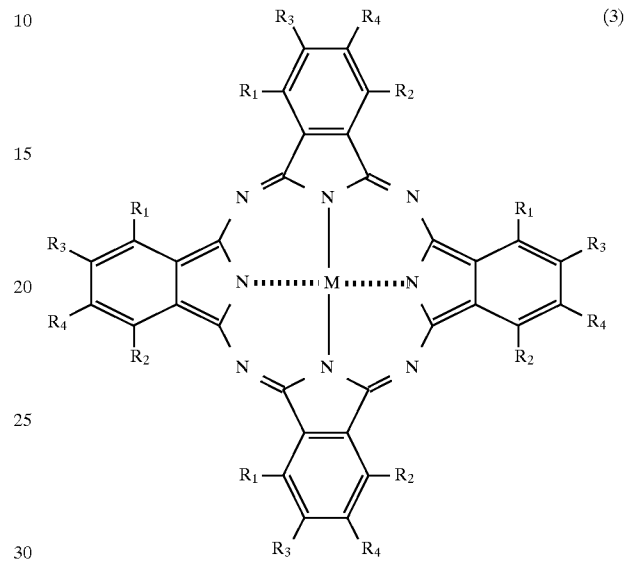

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

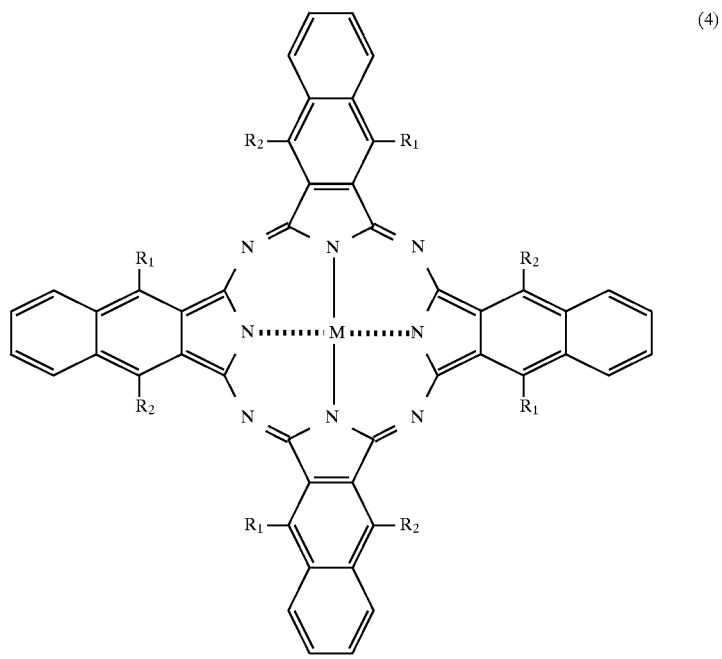

wherein $R_1$, $R_2$ and M are the same as those in the above formula 3; in which $R_1$ and $R_2$ may be interchanged.

25. An optical recording medium as claimed in claim 16, wherein the wavelength $\lambda 1$ of the laser beam is selected from the range between 620 and 690 nm and the wavelength $\lambda 2$ is selected from the range between 480 and 540 nm or between 400 and 440, and wherein the reflectance is 20% or higher to the laser beam having the wavelength $\lambda 1$ and is 15% or higher to the laser beam having the wavelength $\lambda 2$, when measured through the substrate.

26. An optical recording medium as claimed in claim 16, wherein the wavelength $\lambda 1$ of the laser beam is selected from the range between 480 and 540 nm and the wavelength $\lambda 2$ is selected from the range between 400 and 440, and wherein the reflectance is 20% or higher to the laser beam having the wavelength $\lambda 1$ and is 15% or higher to the laser beam having the wavelength $\lambda 2$, when measured through the substrate.

27. An optical recording medium as claimed in claim 16, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

a metal halide; in which $R_1$ and $R_2$ may be interexchanged and $R_3$ and $R_4$ may be interexchanged;

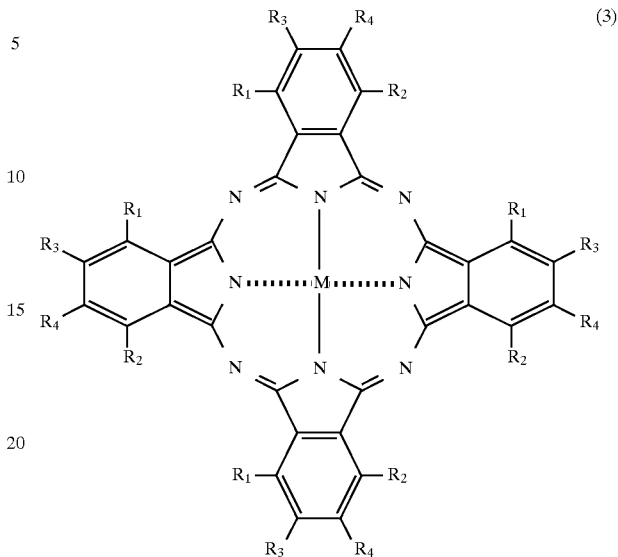

(3)

wherein $R_1$, $R_2$ and M are the same as those in the above formula 3; in which $R_1$ and $R_2$ may be interchanged.

28. An optical recording medium as claimed in claim 3, wherein the wavelength $\lambda 1$ of the laser beam is selected from the range between 770 and 830 nm and the wavelength $\lambda 2$ is selected from the range between 620 and 690 nm, and wherein the reflectance is 65% or higher to the laser beam

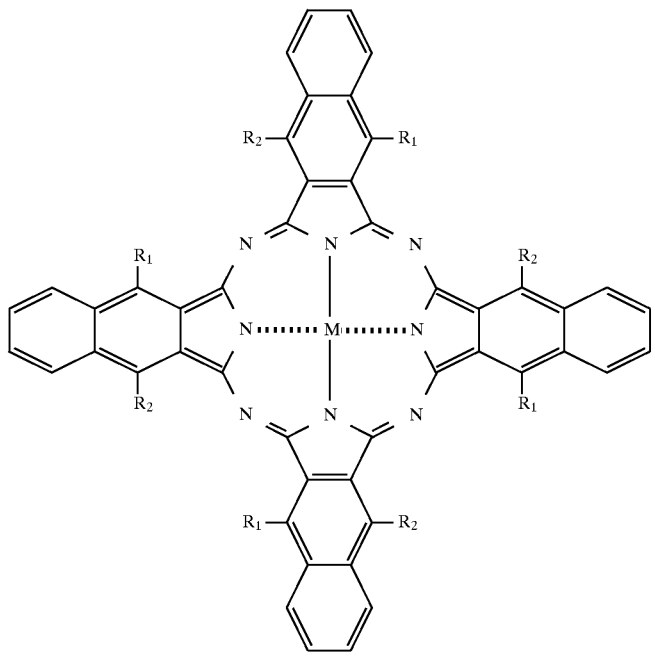

(4)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or having the wavelength $\lambda 1$ and is 15% or higher to the laser beam having the wavelength $\lambda 2$, when measured through the substrate.

29. An optical recording medium as claimed in claim 28 wherein the organic dye used for said light interference layer comprises an azo dye or a metal complex of said azo dye, the azo dye being represented by the following general formula (1):

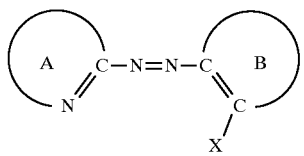
(1)

wherein A is a residue forming a heterocyclic ring along with nitrogen and carbon atoms bonded therewith; B is a residue forming an aromatic ring along with two carbon atoms bonded therewith; and X is a group having an active hydrogen.

30. An optical recording medium as claimed in claim 29, wherein the organic dye used for said recording layer comprises a phthalocyanine dye represented by the following general formula (2):

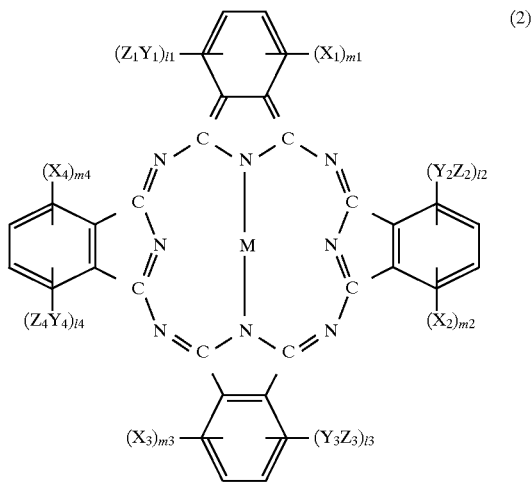
(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

31. An optical recording medium as claimed in claim 28, wherein the organic dye used for said recording layer comprises a phthalocyanine dye represented by the following general formula (2):

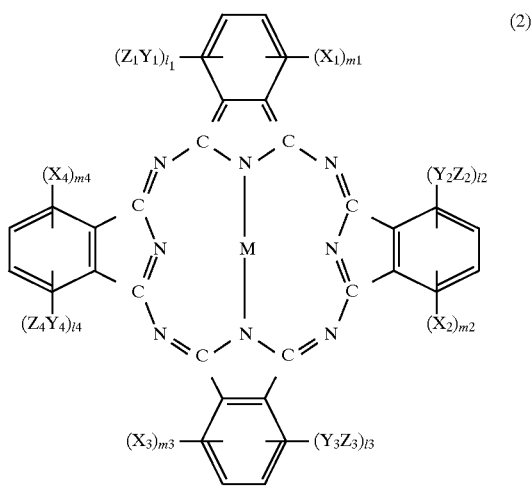
(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

32. An optical recording medium as claimed in claim 28, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

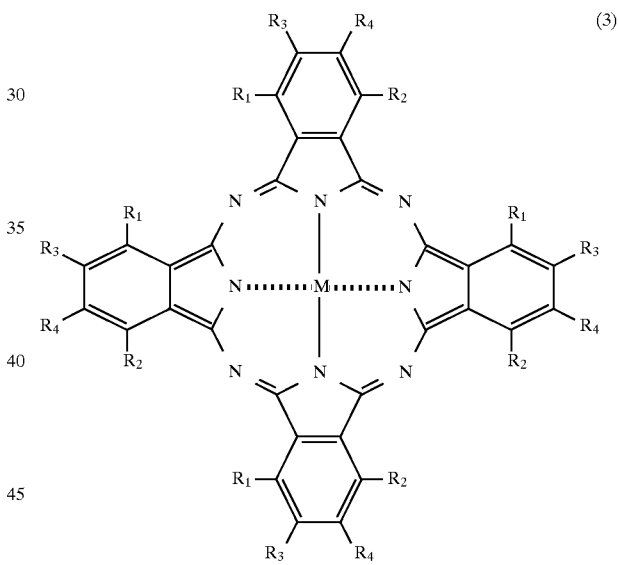
(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged,

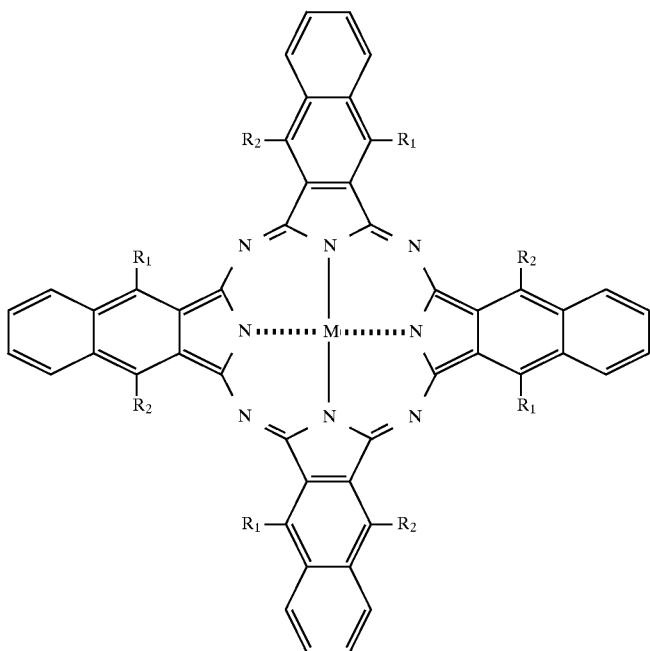

(4)

wherein $R_1$, $R_2$ and M are the same as those in the above formula 3; in which $R_1$ and $R_2$ may be interchanged.

33. An optical recording medium as claimed in claim 3, wherein the wavelength $\lambda 1$ of the laser beam is selected from the range between 770 and 830 nm and the wavelength $\lambda 2$ is selected from the range between 480 and 540 nm or between 400 and 440, and wherein the reflectance is 65% or higher to the laser beam having the wavelength $\lambda 1$ and is 15% or higher to the laser beam having the wavelength $\lambda 2$, when measured through the substrate.

34. An optical recording medium as claimed in claim 33, wherein the organic dye used for said recording layer comprises a phthalocyanine dye represented by the following general formula (2):

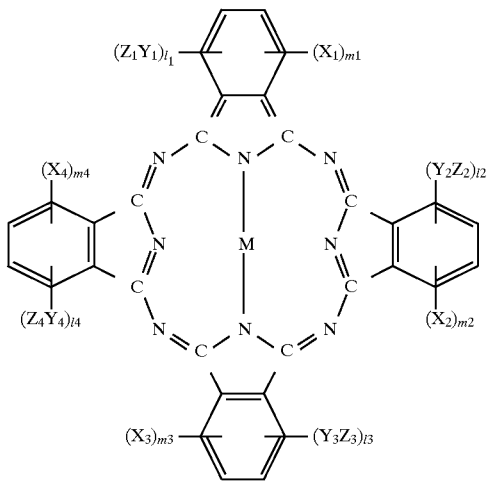

(2)

wherein $Y_1$ to $Y_4$ are each an oxygen atom or a sulfur atom; $Z_1$ to $Z_4$ are each a substituted or non-substituted hydrocarbon group having from 4 to 12 carbon atoms; $X_1$ to $X_4$ are each a halogen atom; $p_1$ to $p_4$ are each 1 or 2; $m_1$ to $m_4$ are each an integer of from 0 to 3; and M is two hydrogen atoms, a divalent metal, a metal oxide or a metal halide.

35. An optical recording medium as claimed in claim 33, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

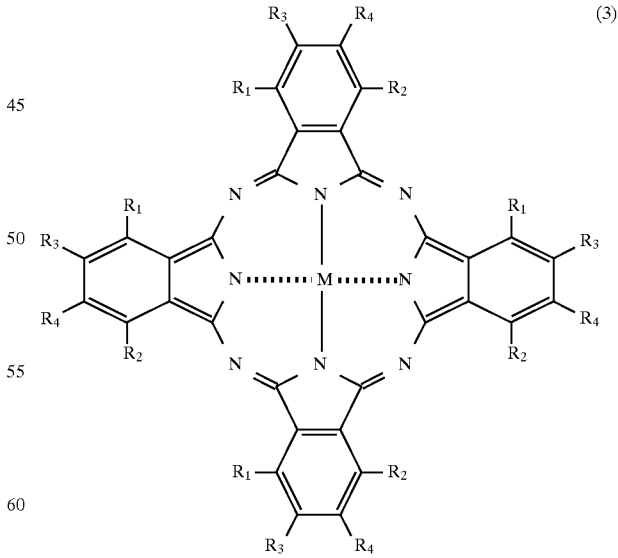

(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged.;

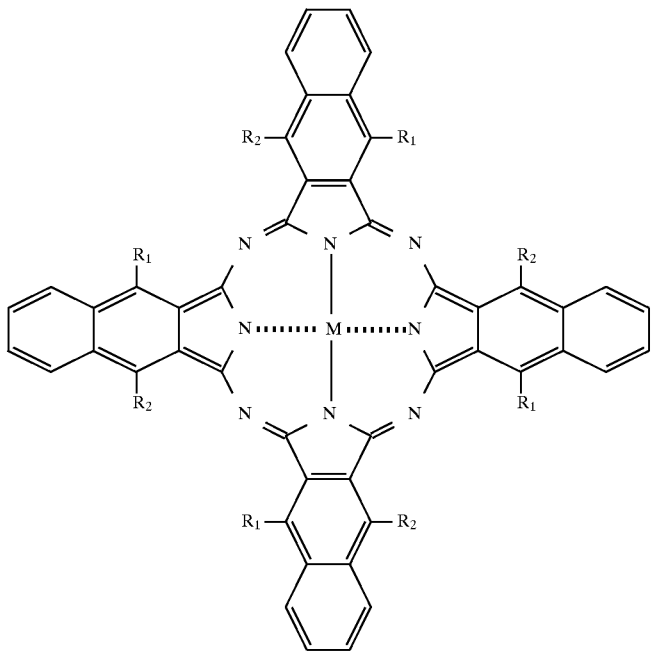

(4)

wherein $R_1$, $R_2$ and M are the same as those in the above formula 3; in which $R_1$ and $R_2$ may be interchanged.

36. An optical recording medium as claimed in claim 3, wherein the wavelength λ1 of the laser beam is selected from the range between 620 and 690 nm and the wavelength λ2 is selected from the range between 480 and 540 nm or between 400 and 440, and wherein the reflectance is 20% or higher to the laser beam having the wavelength λ1 and is 15% or higher to the laser beam having the wavelength λ2, when measured through the substrate.

37. An optical recording medium as claimed in claim 3, wherein the wavelength λ1 of the laser beam is selected from the range between 480 and 540 nm and the wavelength λ2 is selected from the range between 400 and 440, and wherein the reflectance is 20% or higher to the laser beam having the wavelength λ1 and is 15% or higher to the laser beam having the wavelength λ2, when measured through the substrate.

38. An optical recording medium as claimed in claim 3, wherein said light absorbent is at least one phthalocyanine dye represented by the following general formula (3) or naphthalocyanine dye represented by the following general formula (4), and said thermal decomposition promoter is at least one selected from the group consisting of metallocene compounds comprising biscyclopentadienyl complexes of Fe (ferrocene), Ti, V, Mn, Cr, Co, Ni, Mo, Ru, Rh, Zr, Lu, Ta, W, Os, Ir, Sc and Y; chelate complexes comprising acetyl acetonato complexes, phenanthroline complexes, bispyridine complexes, ethylene diamine complexes, ethylenediamine tetraacetic acid complexes, diethylenetriamine complexes, diethylene glycol dimethyl ether complexes, diphosphino complexes and dimethyl glyoxymato complexes; or metal complexes comprising carbonyl complexes, cyano complexes, and amine complexes:

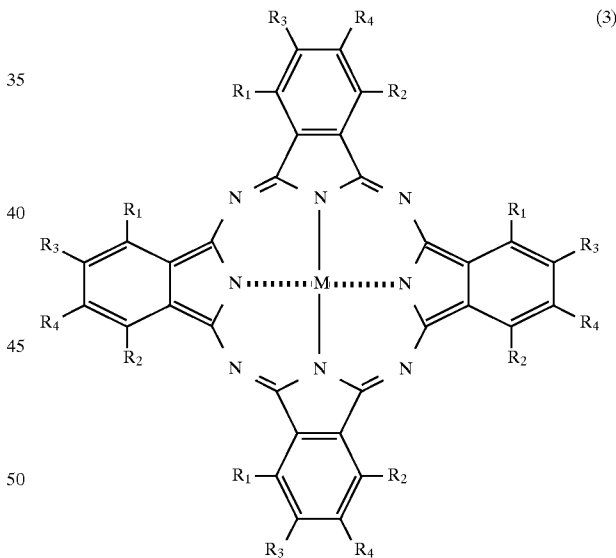

(3)

wherein $R_1$ and $R_2$ are each a linear, branched or cyclic alkoxyl group having from 3 to 18 carbon atoms, provided that —$CH_2$— which is not bonded with the oxygen atom in the alkoxyl groups may be substituted with an oxygen atom; $R_3$ and $R_4$ are each a hydrogen atom or a halogen atom; and M is two hydrogen atoms, a divalent metal, a metal oxide or a metal halide; in which $R_1$ and $R_2$ may be interexchanged and $R_3$ and $R_4$ may be interexchanged;

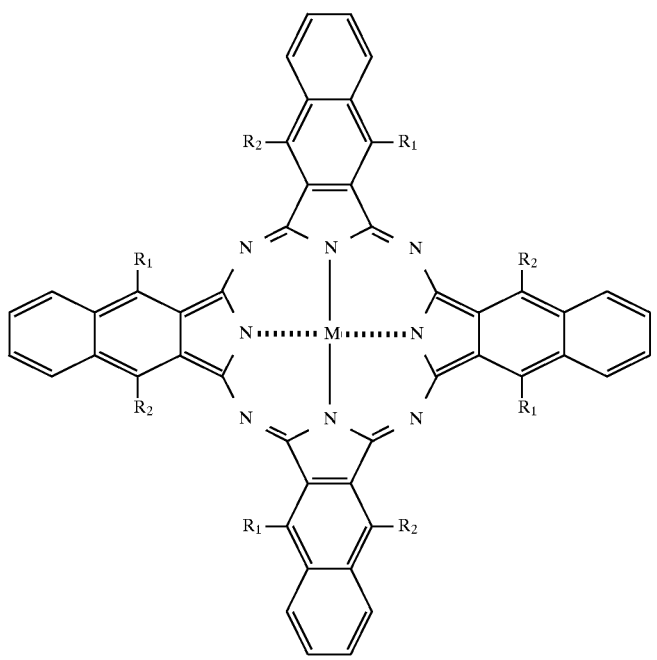
(4)
wherein $R_1$, $R_2$ and M are the same as those in the above formula 3; in which $R_1$ and $R_2$ may be interchanged.
* * * * *

UNITED STATES PATENT AND TRADEMARK OFFICE
CERTIFICATE OF CORRECTION

PATENT NO. : 5,855,979
DATED : January 5, 1999
INVENTOR(S) : Hideki Umehara, et. al.

It is certified that error appears in the above-identified patent and that said Letters Patent is hereby corrected as shown below:

In claim 1, line 38, before "recording" insert --a--; (second occurrence)
　　　　　line 40, delete "substrated" and insert --substrate--; and
　　　　　line 41, delete "ligh" and insert --light--.

In claim 7, line 61, delete "$p_1$ to $p_4$" and insert --$\ell_1$ to $\ell_4$--.

In claim 8, line 23, delete "$p_1$ to $p_4$" and insert --$\ell_1$ to $\ell_4$--.

In claim 11, line 38, delete "$p_1$ to $p_4$" and insert --$\ell_1$ to $\ell_4$--.

In claim 19, line 53, delete "$p_1$ to $p_4$" and insert --$\ell_1$ to $\ell_4$--.

In claim 20, line 23, delete "$p_1$ to $p_4$" and insert --$\ell_1$ to $\ell_4$--.

In claim 23, line 29, delete "$p_1$ to $p_4$" and insert --$\ell_1$ to $\ell_4$--.

In claim 27, locations of Formula (4) and Formula (3) are switched, please reverse them.

In claim 30, line 40, delete "$p_1$ to $p_4$" and insert --$\ell_1$ to $\ell_4$--.

In claim 31, line 4, delete "$p_1$ to $p_4$" and insert --$\ell_1$ to $\ell_4$--.

In claim 34, line 63, delete "$p_1$ to $p_4$" and insert --$\ell_1$ to $\ell_4$--.

Signed and Sealed this

Fourteenth Day of December, 1999

Attest:

Q. TODD DICKINSON

Attesting Officer

Acting Commissioner of Patents and Trademarks